(12) United States Patent
Kady

(10) Patent No.: US 7,147,243 B2
(45) Date of Patent: Dec. 12, 2006

(54) ACCESSORIES FOR A COLLAPSIBLE ROLLING CADDY

(76) Inventor: Darren Kady, 6001 Morgan's Glen Pl., Glen Allen, VA (US) 23059

( * ) Notice: Subject to any disclaimer, the term of this patent is extended or adjusted under 35 U.S.C. 154(b) by 286 days.

(21) Appl. No.: 10/189,085

(22) Filed: Jul. 3, 2002

(65) Prior Publication Data

US 2002/0171228 A1    Nov. 21, 2002

Related U.S. Application Data

(63) Continuation-in-part of application No. PCT/US01/41675, filed on Aug. 11, 2001.

(60) Provisional application No. 60/291,548, filed on May 17, 2001.

(51) Int. Cl.
*B62B 1/00* (2006.01)

(52) U.S. Cl. .................................... 280/655; 280/47.26

(58) Field of Classification Search ................ 280/655, 280/651, 653, 638, 639, 33.998, 37, 42, 47.26, 280/47.31, 47.34, 47.35, 47.371, 655.1, 47.18, 280/47.19, 652, 659, 40, 47.24, 47.315; 220/6, 220/7, 4.29, 769, 751, 735, 212, 528; 206/425, 206/372, 373, 215, 371

See application file for complete search history.

(56) References Cited

U.S. PATENT DOCUMENTS

| | | | | |
|---|---|---|---|---|
| 417,979 A * | 12/1889 | Borcherdt | .................... | 43/57.1 |
| 2,897,999 A * | 8/1959 | Bishop | ........................ | 220/826 |
| 3,492,016 A * | 1/1970 | O'Connor et al. | ........ | 280/47.26 |
| 3,655,088 A * | 4/1972 | Box | ........................... | 220/826 |
| 4,185,848 A * | 1/1980 | Holtz | ......................... | 280/652 |
| 4,620,644 A * | 11/1986 | Miller | ........................ | 220/826 |
| 4,714,013 A * | 12/1987 | Telfer | ......................... | 99/449 |
| 4,864,334 A * | 9/1989 | Ellis | ........................... | 396/419 |
| 5,961,134 A * | 10/1999 | Congleton et al. | ....... | 280/47.18 |
| 6,010,145 A * | 1/2000 | Liu | .......................... | 280/655.1 |
| 6,220,611 B1 * | 4/2001 | Shapiro | ................... | 280/47.34 |

* cited by examiner

*Primary Examiner*—Christopher P. Ellis
*Assistant Examiner*—Bridget Avery
(74) *Attorney, Agent, or Firm*—Jagtiani & Guttag

(57) ABSTRACT

Improvements to a prior art collapsible wheeled caddy are disclosed to enable the caddy to be used for specialized purposes. A hinged lid is attached to the edge of the front panel to close the caddy top while lying proximate the front panel when open. The front panel can be recessed to receive the lid and preferably, arcs in the lid are dimensioned to accommodate the handles. The recess can accommodate one or more storage members, including a storage panel that have been dimensioned to be affixed within the recess. Hangers are configured to interact with the sides of the caddy to accommodate hanging items such as file folders. A back panel can be used containing retaining members to removably affix items to the panel. A stacking caddy is disclosed that has a handle recess and retaining member dimensioned to receive the wheeled handles. Caddy receiving channels are placed in the bottom of the stacking caddy to receive the edges of the wheeled caddy. A spacer unit can be used to stack two wheeled, or a wheeled and stacking, caddys incorporating wheel wells, alignment prongs and locks to prevent separation and lateral movement. A cover can be provided for one or more of the caddys to protect the contents A container case can also be affixed to the front or back panels of the caddy.

13 Claims, 26 Drawing Sheets

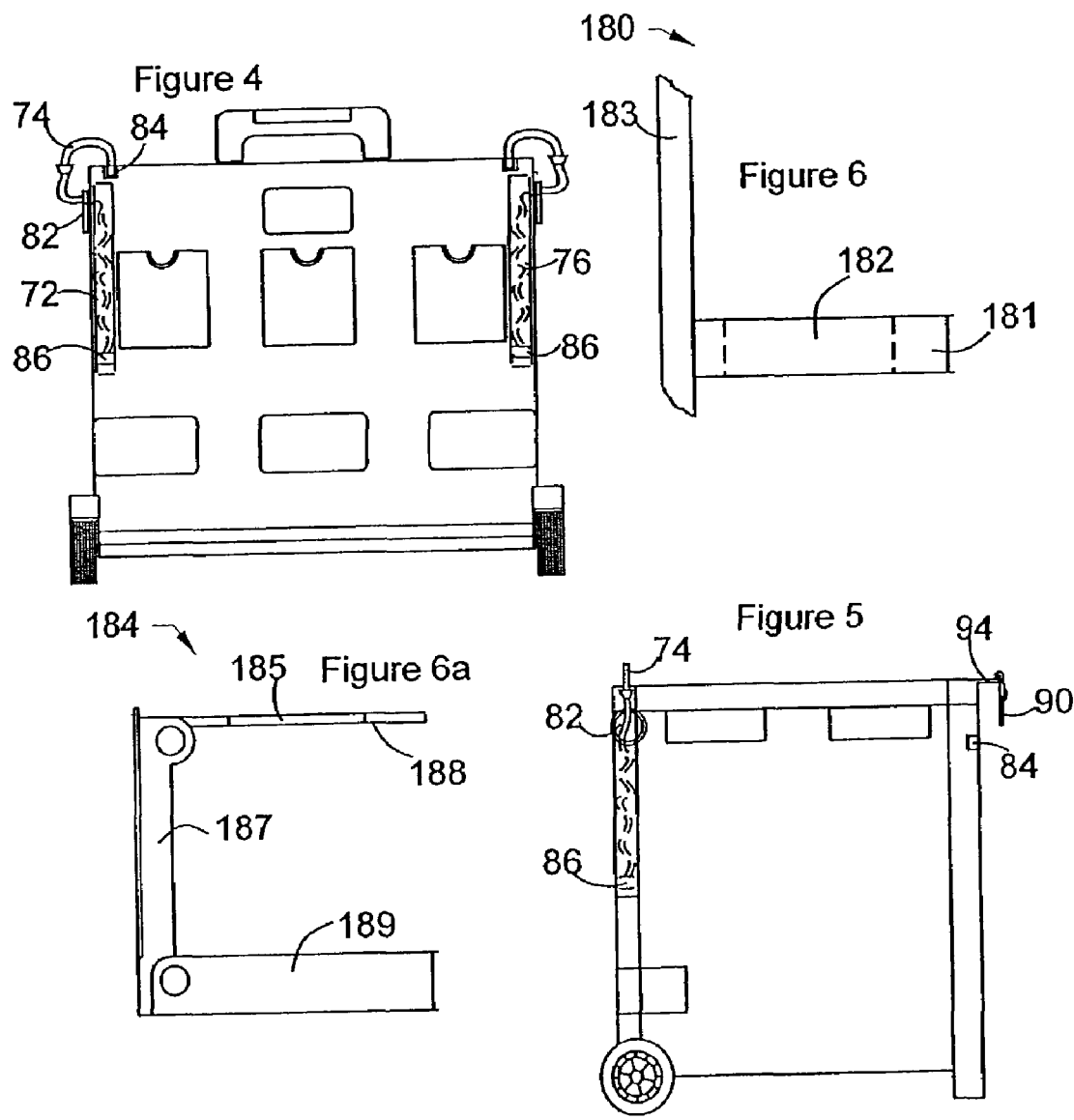

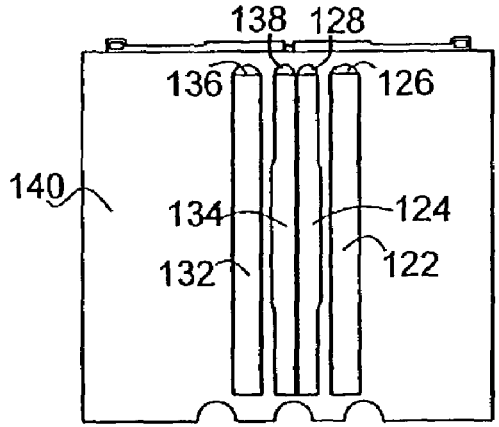
Figure 9
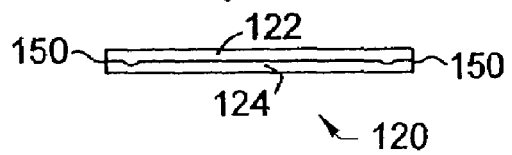
Figure 10
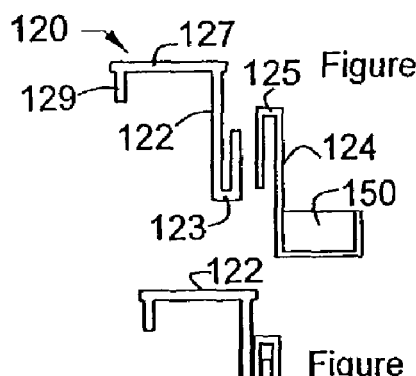
Figure 11
Figure 12

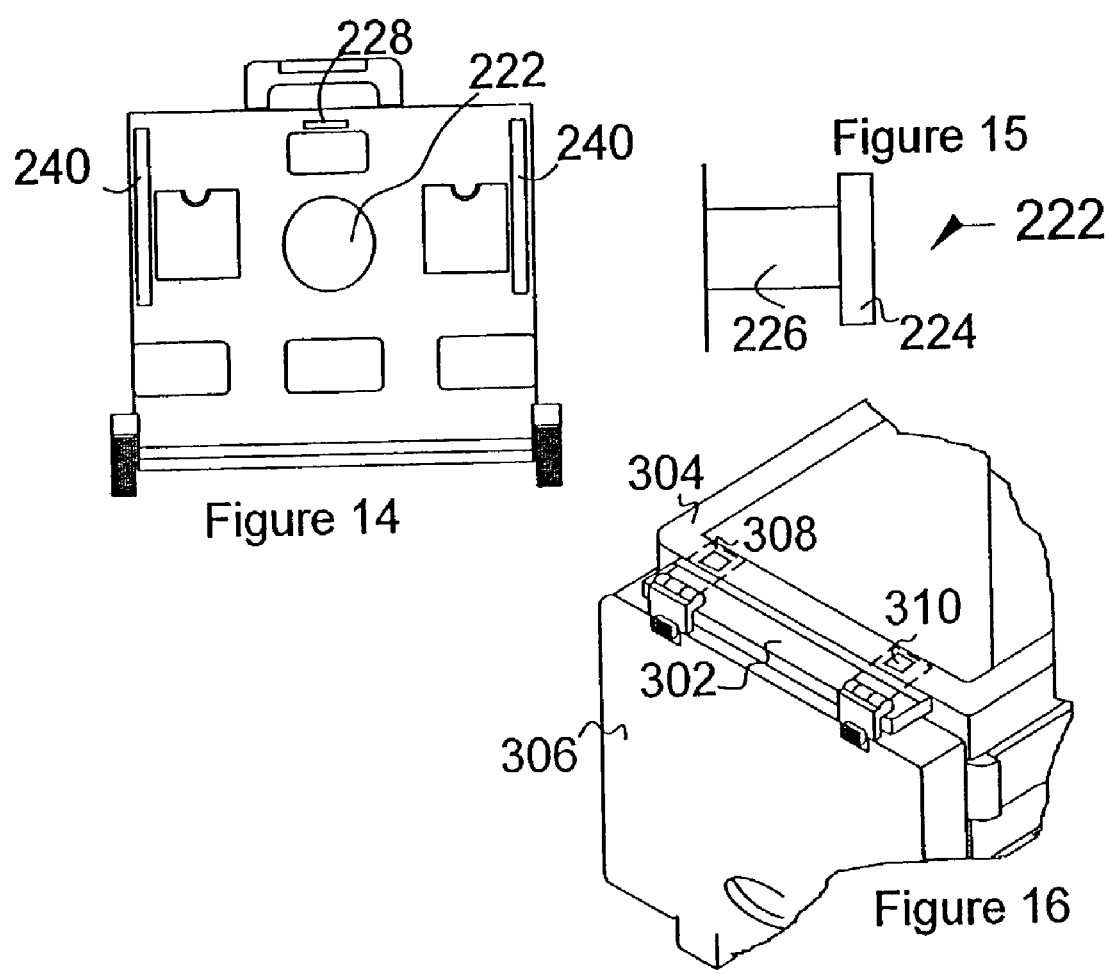

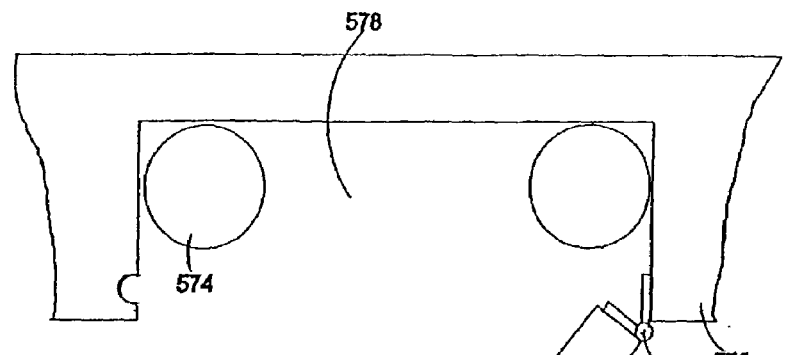
Figure 30
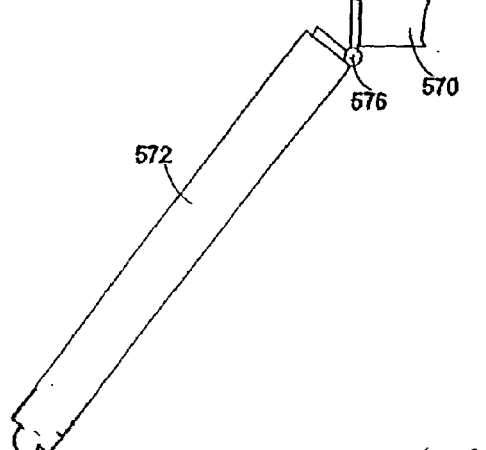
Figure 31
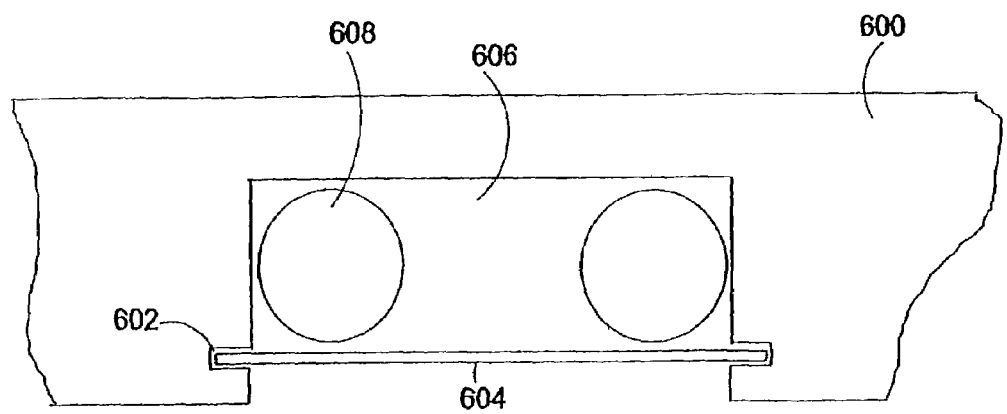

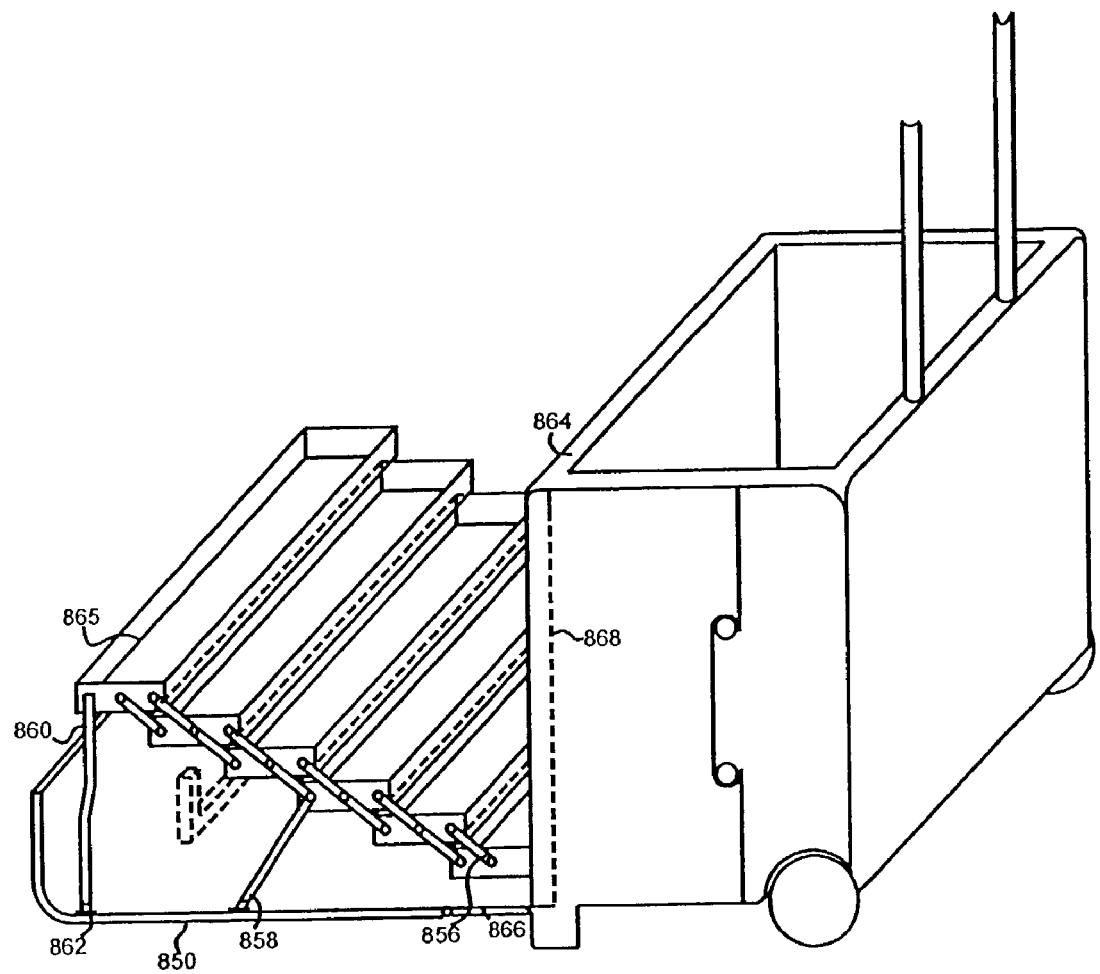
Figure 47
Figure 48
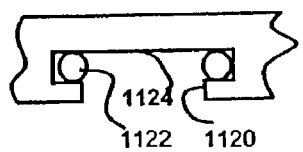
Figure 49
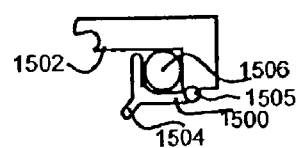

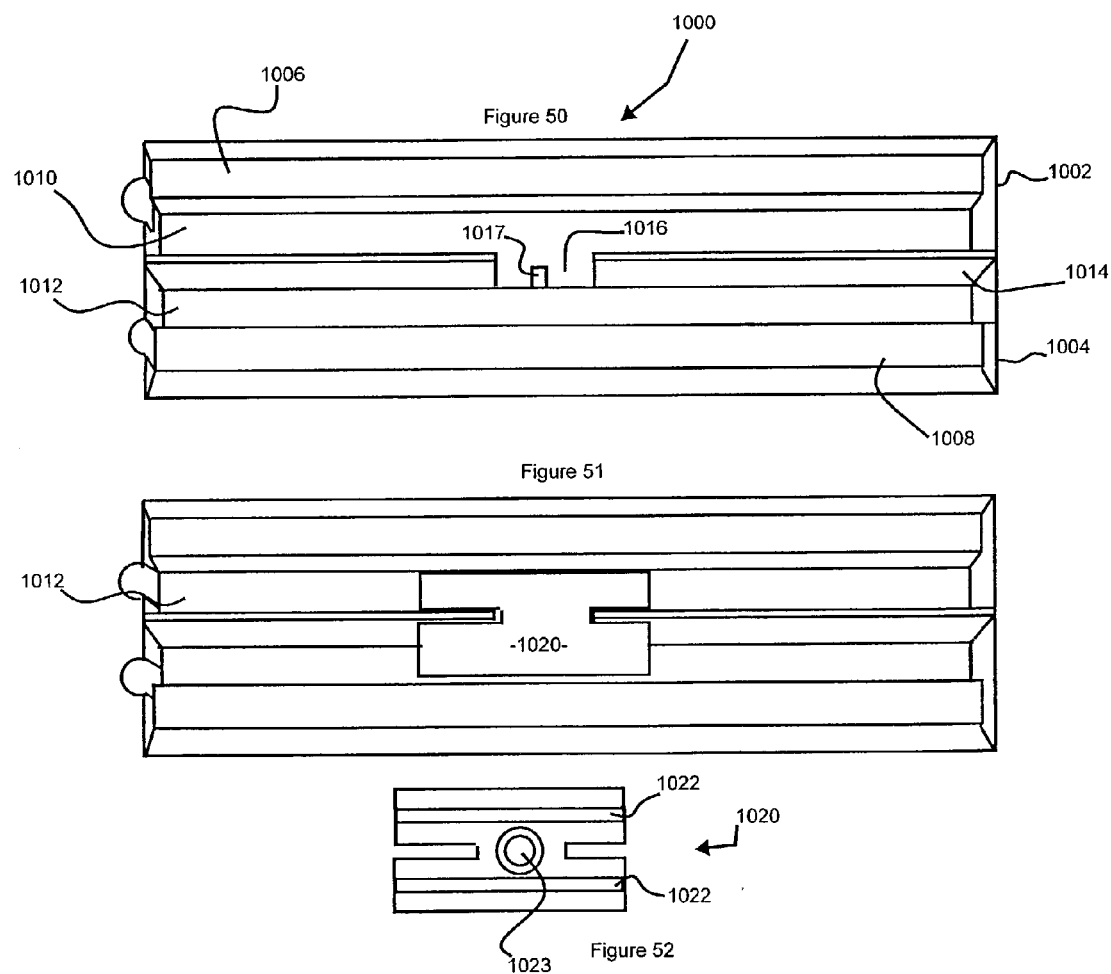

ACCESSORIES FOR A COLLAPSIBLE ROLLING CADDY

RELATE BACK

This application claims the benefits from and is a Continuation in Part of PCT Ser. No. PCT/US01/41675, Filed Aug. 11, 2001, which claims the benefit of Provisional Ser. No. 60/291,548, Filed May 17, 2001, which are incorporated herein as though recited in full.

BACKGROUND OF THE INVENTION

1. Field of the Invention

The disclosed invention relates to an improved wheeled caddy that enables a user to customize the caddy based on an end use.

2. Brief Description of the Prior Art

Collapsible, wheeled carts have been used for year to carry produce and various items. They have not, however, ever been more than a single large cavity for placing groceries or other items. This does not present a problem when the carts are being used to carry large bulky items, however when used for files or merchandise that requires protection and separation, the prior art carts present problems.

Another problem presented with prior art carts is when stacking items such as brief cases or luggage on top of the cart, there is no built in method of retaining the items onto the cart. The only available method in the prior art is to use separate bungie cords or other tying devices to secure the items. Although this works effectively, the loose cords present a storage problem and easily get lost. The disclosed cart overcomes these problem by disclosing a collapsible cart with a removable container, file holders and a built in bungie cord holder.

SUMMARY OF THE INVENTION

A collapsible wheeled caddy has been disclosed in the prior art to carry groceries and other items. The wheeled caddy has a front and back panel, vertically hinged side panels, a hinged bottom panel and retractable handles within the back panel. The disclosed improvements enable the caddy to be used for more specialized purposes. The disclosed caddy has a lid that is hingeably attached to a lip extending from the edge of the front panel, thereby enabling the lid to lie adjacent to the front panel when in an open position and adjacent the edge of the caddy when closed. A portion of the front panel of the caddy can be recessed to receive the lid, placing the lid on the same plane as the non-recessed portion of the front panel. To recess the front panel, the extending lip must be appropriately dimensioned. The lid can be a thin cover or have sufficient depth to form a single or multi-compartment container. The lip must be redimensioned to accommodate for the depth of the container in order to enable the container to rotate about 270 degrees. In some embodiments, the lid rests on two or more of the open caddy edges, while in other embodiments the lid rests only on a single edge. Alternatively, the lip can be dimensioned to space the lid from the recess, bringing it in contact with the front panel. Preferably, the edge of the lid opposing the hinge has arcs that are dimensioned to accommodate the handles when in the closed position.

The recess can accommodate one or more storage members that have been dimensioned to be affixed within the recess. Alternatively, a storage panel, containing at least one storage member, can be configured to fit within recess. A pair of hangers is configured to interact with the hingeable sides of the caddy. The hangers have a back support configured to lie adjacent the hinged side panels. A top plate is at right angles to the back support and a back panel is at a right angle to the top plate. The dimensioning between the back panel and back support form a snap fit over the hinged side panel edge. The hangers can have L-shaped brackets that extend at a right angle from the back panel. The leg of the L opposing the back panel serves to retain items, such as hanging file jackets, within the bracket. The back panel can, alternatively, continue to the bottom panel. Clips, or other retaining members, can be placed on the back panel to removably affix items to the back panel. An equipment receiving area can be placed in the caddy that has been configured to receive equipment, such as a stapler, and is designed to enable the equipment to be stored and used while in the receiving area.

A support rod can be used to provide support to portions of said lid not lying adjacent an edge of the caddy. The opposing edges of the caddy can be notched to receive the support rod, enabling the lid to remain flush with the edges. One or more section dividers can be placed within the caddy to divide the caddy into one or more smaller sections. Pairs of channels, directly opposing one another, can be incorporated within the mold to receive a divider panel to separate the caddy into rectangular sections. Luggage or other items can be placed on the top of the closed lid with flexible holders, such as retractable belts, can be used to retain the items placed on the lid in position.

A stacking caddy can also be incorporated with the wheeled caddy. The stacking caddy consists of a front panel, a back panel, vertically hinged side panels, hinged bottom panel, and a lid. The back panel has a handle recess that is dimensioned to receive the handles, as well as a handle retaining member to prevent inadvertent removal of the handles from the recess. The lid is hingeably affixed to the front panel edge, lying proximate the front panel when open and adjacent at least one caddy edge when closed. Preferably caddy receiving channels are placed in the bottom of the stacking caddy that are dimensioned to receive the edges of the wheeled caddy, preventing lateral movement between the stacking caddy and wheeled caddys.

A spacer unit can be used to stack two wheeled, or a wheeled and stacking, caddys. The spacer unit has a top receiving area with wheel wells, alignment prongs, and locking members. The bottom receiving area has a caddy receiving channel dimensioned to receive the top edges of the lower caddy, a handle receiving area and locking members. The bottom receiving area of the spacer unit is placed on a first, bottom, caddy and locked to the bottom caddy. A second, wheeled caddy, is then placed in the top receiving area, and locked to the spacer unit. The spacer unit wheel wells and alignment prongs interact with the top caddy to prevent lateral movement. A container case can also be affixed to the front or back panels of the caddy. The case has a hinged lid and contains multiple self-leveling containers affixed to a rotatable brace. The rotatable brace folds to bring the containers within the case when the lid is closed and extends the containers in an accessible manner when the lid is open.

BRIEF DESCRIPTION OF THE DRAWINGS

The advantages of the instant disclosure will become more apparent when read with the specification and the drawings, wherein

FIG. 4 is a rear view of the disclosed caddy having a securing cord recess and pull down storage or cup areas;

FIG. 5 is a side view of the securing cord of FIG. 4;

FIG. 6 is a side view of an open cup holder;

FIG. 6A is an alternate embodiment of a cup holder;

FIG. 9 is a top view of the base of the caddy with the recessed file holders;

FIG. 10 is a front view of the assembled file holder;

FIG. 11 is an exploded side view of the file holder of FIG. 10;

FIG. 12 is a side view of the assembled file holder of FIG. 10;

FIG. 14 is a rear view of the caddy illustrating the protective bumpers;

FIG. 15 is a side view of a bungie cord holder;

FIG. 16 is a top perspective view of an alternate caddy design with a removable lip;

FIG. 30 is a method of retaining the stacked caddy;

FIG. 31 is a top view of an alternate retaining method for the stackable caddy;

FIG. 47 is an perspective view of an alternate fold out storage box in an open position;

FIG. 48 is a top view of an alternate design for receiving the lower caddy handles within the top caddy;

FIG. 49 is a top view of an additional design for maintaining the stackable caddies in a stacked position;

FIG. 50 is a perspective view of an alternate base holder for the storage of file hangers;

FIG. 51 is a perspective view of the holder for storage files of FIG. 50 with a retaining brace in place; and FIG. 52 is a bottom view of the retaining brace of FIG. 51.

DETAILED DESCRIPTION OF THE INVENTION

The collapsible plastic caddy has been known in the art, however, until the disclosed improvements, the caddy has only been useful for carry groceries or miscellaneous articles. The disclosed improvements enable the caddy to be used for numerous recreational activities, sports or tools, as well as office or business related applications.

Figure 1:
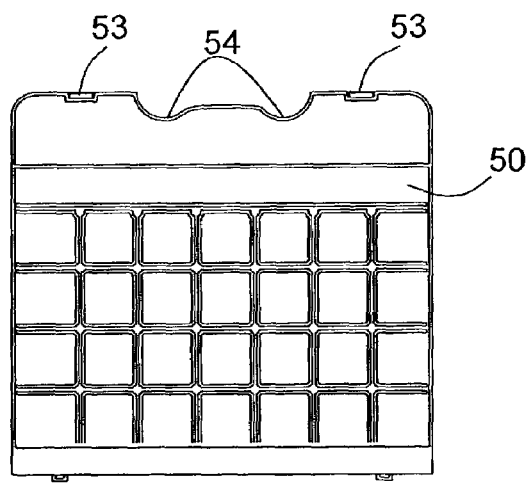
FIG. 1 is a perspective view of the disclosed container top caddy in the open position.

The disclosed caddy 10, as illustrated in FIG. 1, is illustrated in the open position. The caddy 10 has hinged sidewalls 20 and 22 that enable the caddy 10 fold, bringing the front wall 26 toward the rear wall 24. The rear wall 24 contains the handles 28 that preferably retract into, or adjacent to, the back wall 24. The embodiment illustrated in FIG. 1 has wheels 21 to enable the caddy 10 to be easily rolled.

Figure 2:
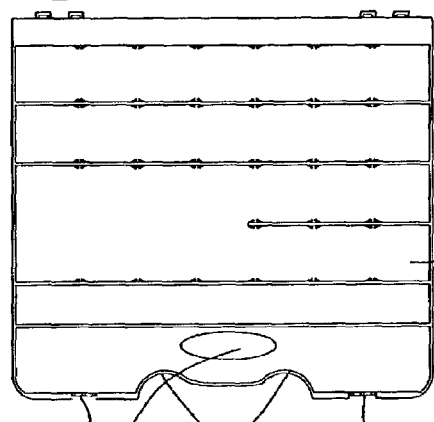
FIG. 2 is an exploded top view of the open partitioned container top for the caddy of FIG. 1.

To enable the caddy 10 to more easily hold small items, the lid of the disclosed caddy 10 is a partitioned container 12, illustrated in FIG. 2, which is preferably manufactured with sufficient strength to enable the container to be used as a seat. The partitioned container 12, a well as other preferred rotating lids disclosed hereinafter, is hinged to the lip 14 of the front wall 26 using either standard hinges or, preferably, separable hinges 30. As an alternative to the container being attached to the front wall 26 of the caddy, the container can be affixed to any non-collapsible portion of the caddy, although the embodiment employing the lip 14 as disclosed in more detail hereinafter, can only be employed on the front wall 26. In other embodiments, depending upon end use and manufactures preference, it can be preferable that the container is affixed with other methods of attachment, such as snap clips, slide, loops or any equivalency that enables the container or lid to permit access to the interior of the caddy. Additionally, the access to the release, whether it is a clip or type of mechanism, can be accessible when the container is open or closed and will be dependent upon manufacturer's design.

In alternate embodiments the container can be redesigned to enable multiple other uses. This can include padding the container to carry delicate items such as a laptop or other electronic equipment. Alternatively, the container can be divided to carry a single large item, such as a retractable extension cord, with space for smaller items around. It should also be noted that the partitions and depth can be adjusted to hold such items as CDs and CD player. The container can also be used as a lunch box, sizing some compartments to receive standard freezer packs. Alternatively, the container can be divided horizontally with the lid containing separate compartments that can contain freezer packs. The container can also be one or more water holders to enable the user to carry water or other liquids. It should be noted that any of the embodiments disclosed herein can be combined with other embodiments and are not limited to the embodiments with which they are described.

The use of alternate affixing devices enables the container to be attached to any wall or base portion of the caddy. In the preferred embodiments, whatever the method of attaching the container, the container is preferably completely removable from the caddy. This removability enables the container to be stored in a location remote from the caddy for security reasons or convenience. Thus, the container can be moved to a table to for sewing supplies, to a stream as a tackle box or locked in a safe place if used to hold or display jewelry.

In most applications it is preferable that the partitioned container 12 lies flush with the front wall 26 when in the open position and adjacent the edges of the front wall 26 and at least a portion of the side walls 20 and 22 when in the closed position. Therefore, when hinges, or other appropriate securing methods, are used they should have sufficient rotation to enable the partitioned container to lie adjacent to the open end of the caddy in a first position and adjacent to the front wall in a second position. One method of obtaining the 270° rotation required to enable the container to lie adjacent to both the front panel and the top is to provide a front rim, or lip 14, to the caddy 10. By providing a front rim 14, equal to the depth of the container 12, the container 12 is free to swing to a position that enables the non-hinged side to "store" under the rim 14. In order for this attachment method to be successful, the container side of the hinges must be positioned on the side of the container that is adjacent the edges of the caddy when closed while the opposing side of the hinges is connected to the lip 14. Other methods of securing the container to the caddy while providing the required rotation will be evident to those skilled in the art.

The partitioned container 12 of FIG. 2 consists of a partitioned bottom 50 and a cover 52. The handle 18 in this embodiment is a cut out portion, however the handle can be of any configuration that will interact with the caddy 12 by allowing the partitioned container 12 to open and close. In the embodiment illustrated herein, the container 12 has an outer periphery about equal to that of the periphery of the open caddy. To enable the container 12 to interact with the handles 28, the opening end of both the bottom 50 and cover 52 must have caddy handle recess portions 54 and 56 that are dimensioned and positioned to receive the handles 28. Alternatively the body of the container can be dimensioned to rest on the periphery of the open caddy with the container side proximate the handles. In this configuration a handle can extend from the container, resting on the caddy edge between the handles. Other dimensioning of the container will be evident to those skilled in the art. The cover 52 is hinged to the bottom 50 using means known in the art that will enable the cover 52 to open while the partitioned container 12 is resting on the open end of the caddy 12. Additionally, any latch system, such illustrated latch 53, must be such that it maintains the partitioned container 12 closed during transportation.

Figure 13:
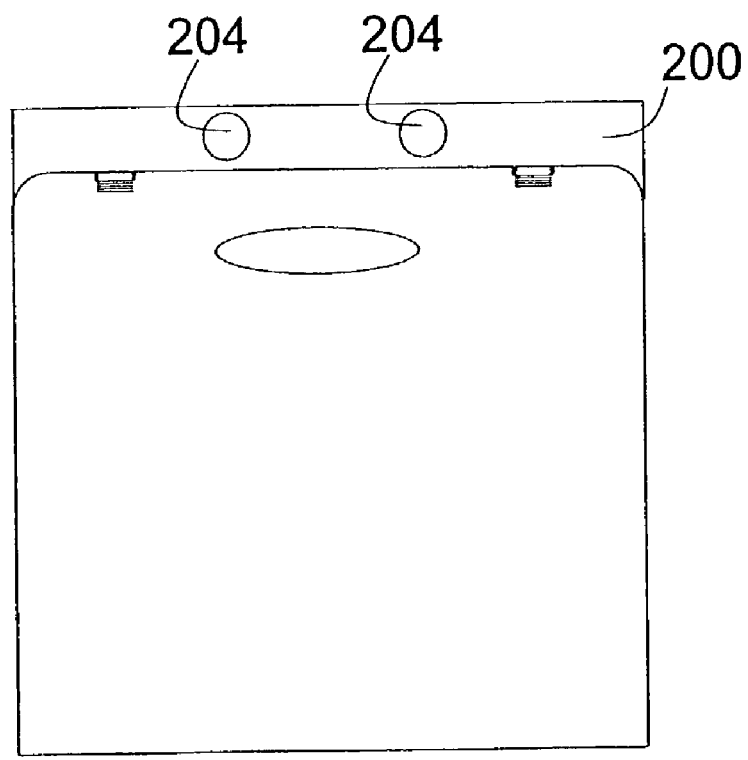
FIG. 13 is an alternate embodiment of the container.

In embodiments where the container does not extend completely from the front wall to the back wall, the caddy handle recess portions are not necessary. In the embodiment illustrated in FIG. 13, the container 200 does not extend to the back edge 202 of the container and therefore does not interfere with the handles 204. It should be noted that the support for the container is predominately on three sides as opposed to on all four sides as disclosed in other embodiments herein.

Figure 53:
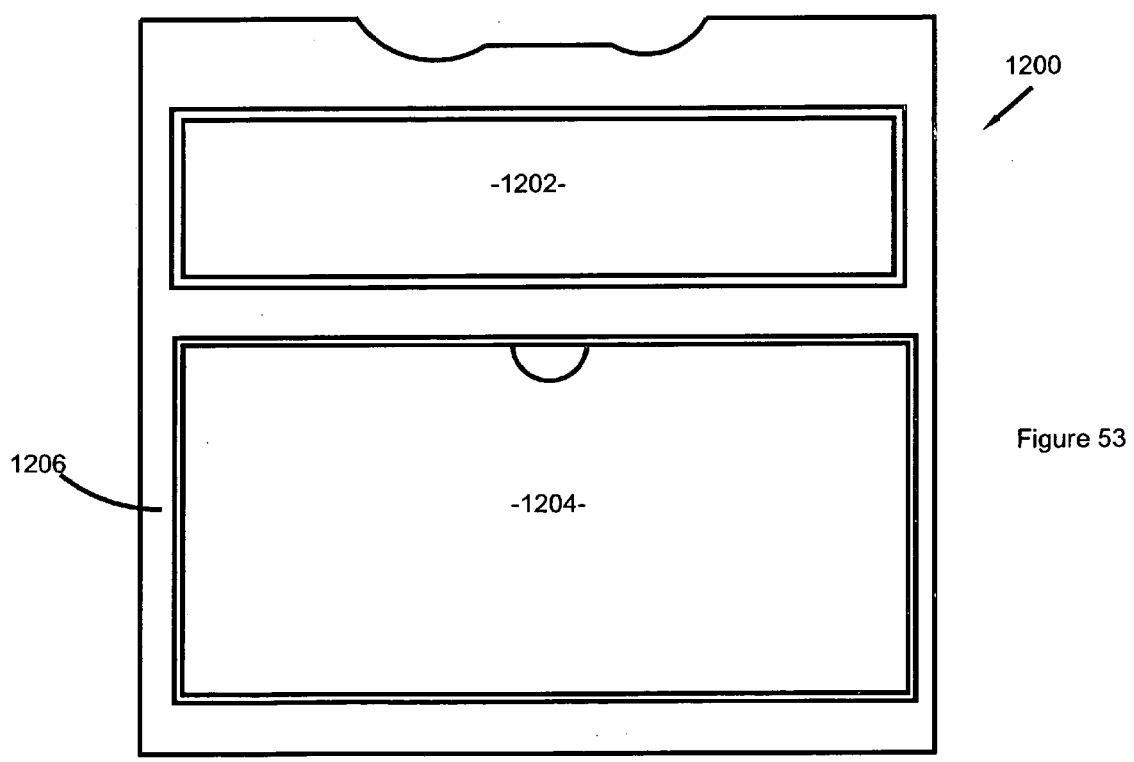
FIG. 53 is a top view of a container having multiple individual lids.

It should be noted that although the figures herein illustrate a single lid with opposing compartments, the partitioned container can be divided in any number of ways that will achieve the desired results. In addition to the standard flat lid and partitioned bottom, the container can be divided horizontally with closed, partitioned compartments on the lid and open compartments on the bottom. In designs where the lid is compartmentalized, the access can be from either the exterior or interior of the container. For example, 1200 as illustrated in FIG. 53 the lid could have several small, hinged areas, or lids 1202 and 1204, that permit access to one or more of the partitioned areas without opening the entire lid 1206. The variations to the partitioned container will be evident to those skilled in the art.

Figure 3:
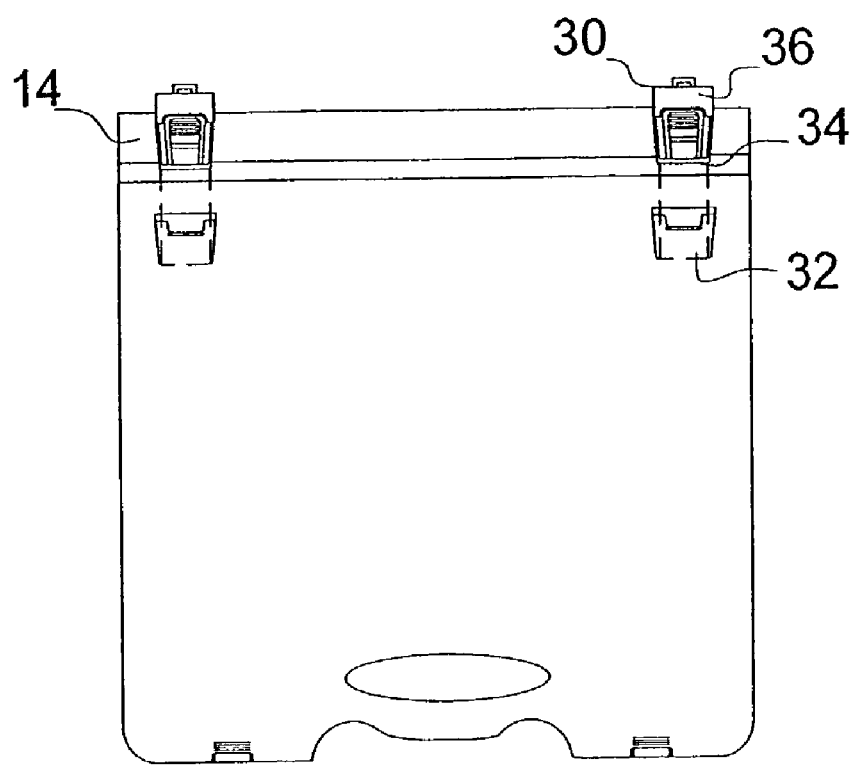
FIG. 3 is a front view of the two-part hinges for use with the partitioned container top.
Figure 20:
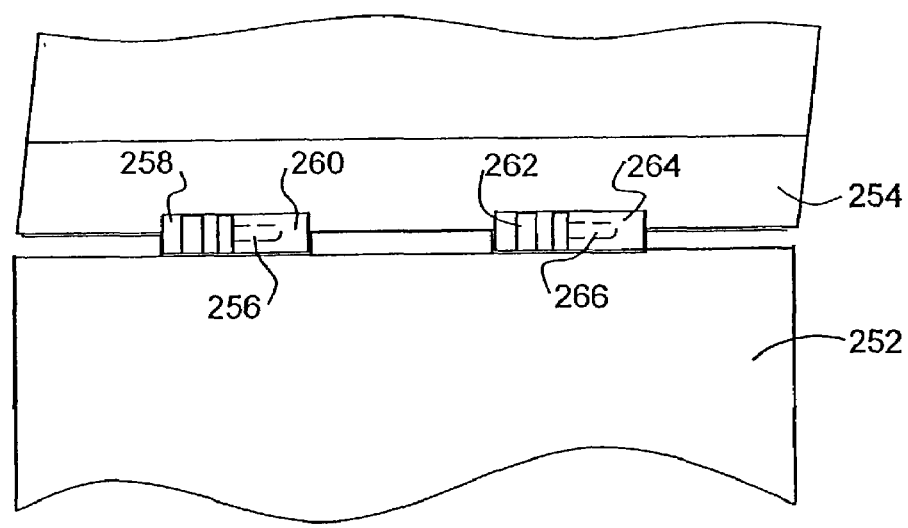
FIG. 20 is a perspective front view of an embodiment illustrating an alternate hinge design.
Figure 21:
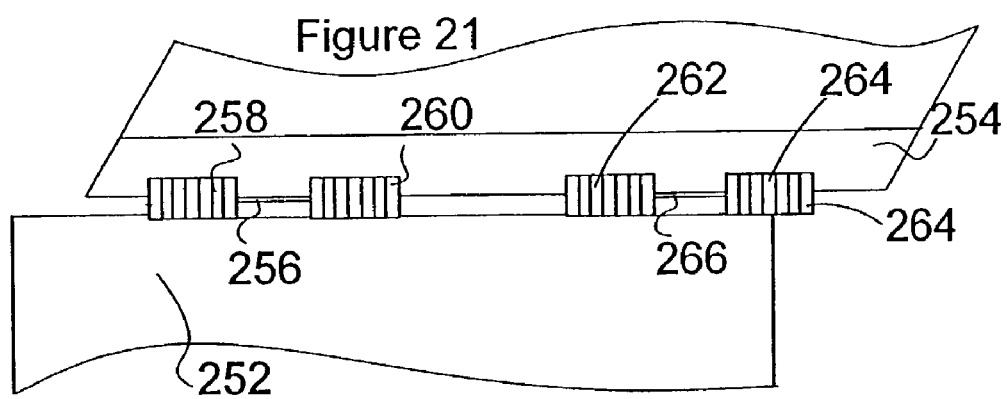
FIG. 21 is a perspective front view of the hinge design of FIG. 20 with the container being partially removed.

In the preferred embodiment, the separable hinges 30, as illustrated in FIG. 3, are manufactured in two parts to enable the partitioned container 12 to be removed from the caddy 10. The top portion 36 of the separable hinges 30 is connected to the front rim 14 while the bottom portion 32 is recessed into the base of the partitioned portion 50. The separable hinges 30 illustrated herein are shown to be separated by a release button, however any equivalent release method can be incorporated, such as sides that press inward, twisting a release section, or slide pins as illustrated in FIGS. 20 and 21 and described hereinafter.

As the caddy 10 is advantageous for carrying items on top of the caddy 10, as well as within, securing, or bungee or the equivalent elastic or non elastic, cords provide a means to maintain any articles being carried on top of the caddy 10. In the embodiment illustrated in FIGS. 4 and 5, the securing cords 76 are stored in a pair of cord recesses 72 at the back corners of the caddy 10. In this embodiment, the hooks 74 are maintained in a receiving hole 78 placed in the top edge of the caddy. Alternatively, hooks or other eqivalent retaining means can be provided to maintain the bungie cord hooks 74 adjacent to the caddy. The end of the securing cord 76 is preferably provided with a stop disc 86 that has a diameter greater than the exit port 82. The securing cord 76 is pulled until the stop disc 86 comes in contact with the exit port 82, thereby providing resistance. This prevents the securing cord 76 from having to be removed from the recess 72 and secured at both ends. Although the securing cord can be affixed to the bottom of the recess, it requires additional cord and makes the storage more difficult.

Figure 7:
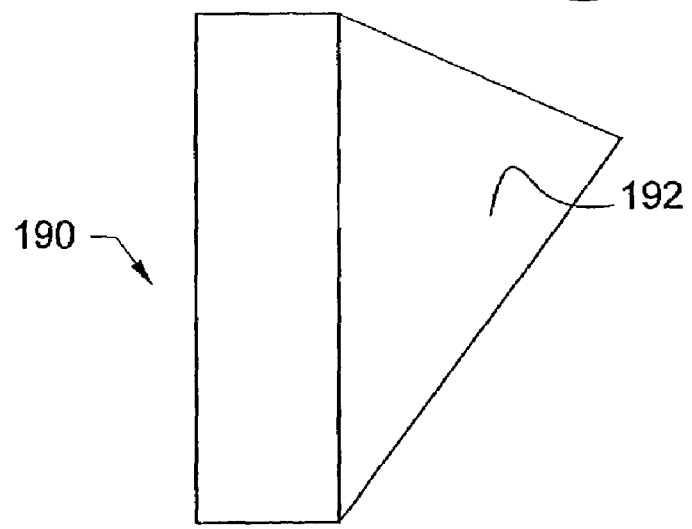
FIG. 7 is a side view of a small, fold out item holder.

The bungie cord can also be placed inside one of the small item holders 190 illustrated in FIG. 7 with one end secured to the caddy within the holder 190. Alternatively the bungie can be loose within the holder 190 and independently secured to the caddy upon use.

As an alternative to having recessed bungie holders, as illustrated in FIGS. 4 and 5, the bungie cord can be wrapped around a holder 222 as shown in FIG. 15. The holder 222 as illustrated in FIGS. 14 and 15 is a bar 226 with a stop plate 224 to prevent the cord from sliding of, although other designs providing the equivalent retaining areas can be incorporated. An eye hook or loop 228, or notch in the back of the caddy, can be used to retain the end of the bungie cord.

As seen in FIG. 5, when the container 12 is removed from the caddy 80, the rim 94 and the hinge top portion 90 remain forming an L on the caddy 80. Alternatively the hinges 30 can be reversed, with the bottom portion 32 of the hinge 30 recessed into the caddy. Although it is not a necessity to have the partitioned container 12 removable, it is advantageous to the user.

The back of the disclosed caddy 10 is an ideal location for smaller individualized holders, although individualized holders can be placed on any panel of the caddy or directly onto the container. Examples of such holders are cup holder 180 of FIG. 6, cup holder 184 of FIG. 6a and/or a key, or other miscellaneous small item holder 190 of FIG. 7. The cup holder 180 is a hinged, or otherwise extendable unit, that snaps or recesses into a closed position. A cut out 182, or other means known in the art, of retaining a cup is provided with the cut out 182 being set into the cover 181 or as a separate unit (not shown). The cup holders 180 can be recessed within the caddy side, there by enabling the cover 181 to lie flush with the surface of the caddy 183 or extend slightly from a backing panel 187 as illustrated in FIG. 6a. In this embodiment, the cup is slid through hole 185 in an upper frame 188, with the bottom of the cup resting on the base panel 189. This embodiment can be attached directly to either a recessed or outer portion of the caddy. The small item holder 190 is preferably provided with a pair of side closures 192 to retain the small articles. The size of article capable of being retained within the closed small item holder 190 will depend upon the depth and size of the holder. Both the cup holders 180 and the small item holders 190 can also be placed on the sides or front of the caddy.

Figure 8:
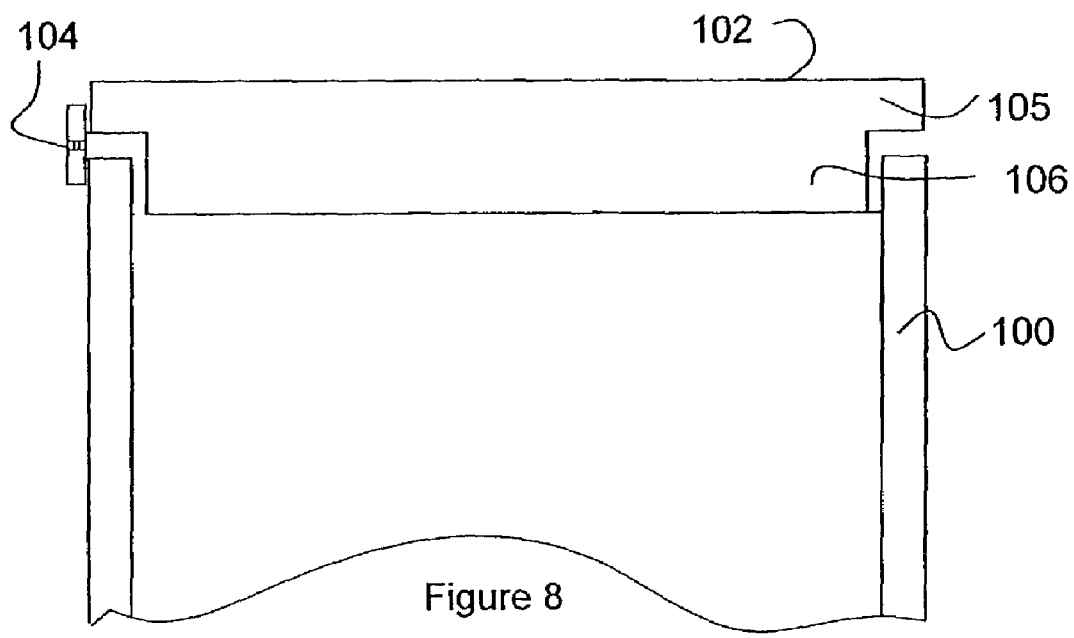
FIG. 8 is a cutaway side view of another embodiment of the partitioned container, partially recessed within the caddy.

In the embodiment disclosed in FIG. 8, the partitioned container 102 is recessed into the open top of the caddy 100. This enables the depth of the partitioned container 102 to be greater than that of the foregoing embodiments without adding any additional height to the caddy 100. In order to swing open, the extended depth 106 must be recessed a sufficient amount from the container lip 105 to prevent the extended depth 130 from coming in contact with the walls of the caddy 100. Any horizontal dividing of the partitioned container 102 must take into account the need for the container 102 to be removed from the caddy 100 or swing open, using the hinges 104, as a single unit. Any additional latches or hinges will be evident to those skilled in the art.

In order to protect the back of the caddies disclosed herein, runners 240 can be added to the back, as illustrated in FIG. 14. The runners 240 can be raised beyond the level of the back, as well as any of the holders, thereby preventing contact with the back panel of the caddy while going up stairs, lifting onto platforms, etc. The number of runners 240 and their placement will be dependent upon end use and size of the caddy and will be evident to those skilled in the art. The runners 240 can be manufactured from any material that will provide the resilience and protection required while not creating friction with the adjacent external surface.

Figure 17:
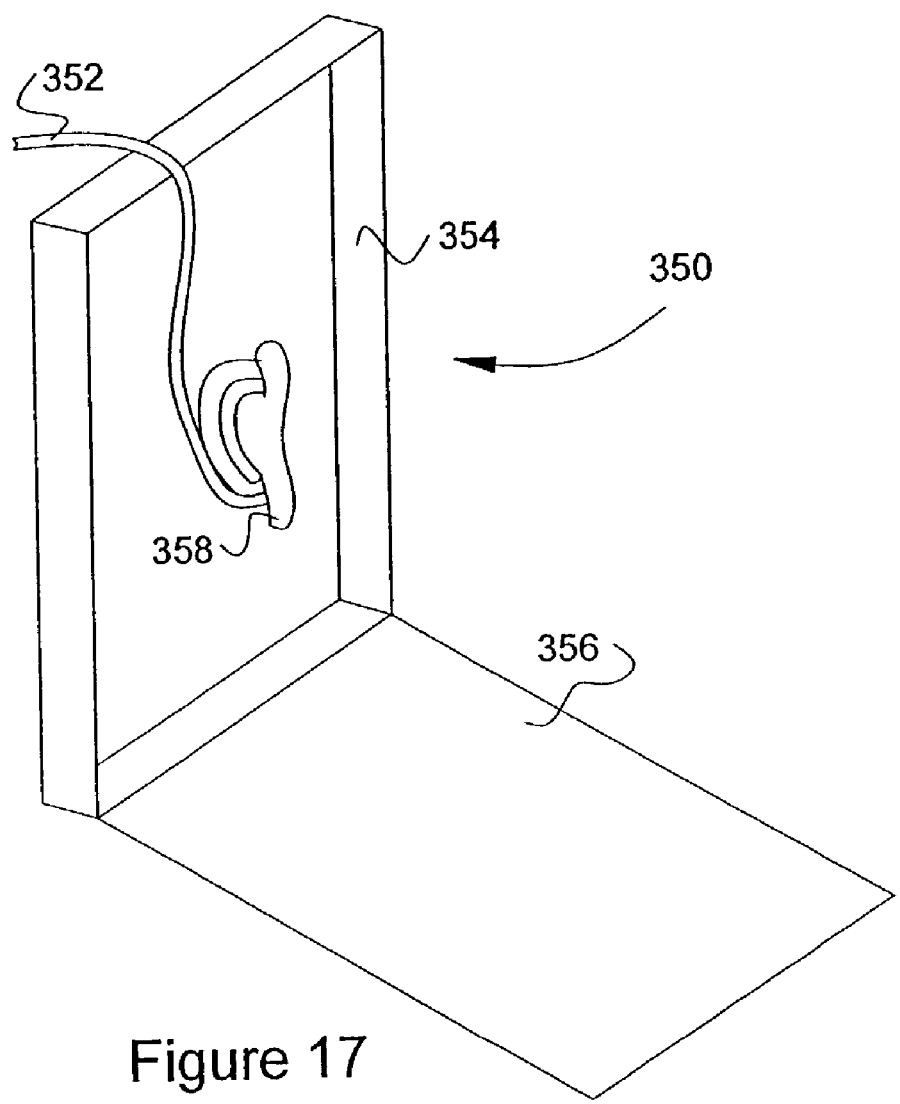
FIG. 17 is a perspective view of a bungie cord holder to be recessed within the caddy.

An alternate method of making the container removable is illustrated in FIG. 16 wherein the lip 302 is removably attached to the caddy 304. The container 306 is hingeably connected to the lip 302 and can be connected in either a removable or permanent manner. In this embodiment the connectors 308 are recessed within the lip 302 and front of the caddy 304 and released from the caddy 304 through the use of buttons 310 or other release mechanisms, such as slides, turn buckles, or their equivalents. It should be noted that this is one manner of removably securing the two units together and other methods will be evident to those skilled in the art. In FIG. 17 the bungie cord storage area 350 consists of a holder 354 and a cleat 358. The holder 354 can be either recessed into, or extend outward from, the caddy. In the illustrated embodiment the storage area 350 has a door 356 that closes and to hide the cleat 358 and bungie cord 352. The door 356, which can be secured in any manner known in the art, provides protection for the cleat 358 and bungie 352, as well as has aesthetic value. In alternate embodiments, especially where the storage area 350 is recessed into the caddy, the door can be eliminated if so desired. In this embodiment, the bungie cord 352 is maintained wrapped around the cleat 358 until needed. At that point in time, only the amount of cord 352 required to secure the object(s) to the caddy is unwound with the remaining cord 352 being left wrapped around the cleat 354. Other designs for the cleat, or cord holder, will be evident to those skilled in the art and will be determined to some extent by the decision as to whether or not to recess the cord and/or include a cover. The bungie holder can also be of any other design known for use with bungies, cords or other cord type devices. This includes retractable seatbelt type devices as well as mechanical mechanisms such as a crank or wind around bar that is, for example, pulled out to wind and pushed in to lock. The various method of storing the securing cords will be evident to those skilled in the art.

In conjunction with any of the foregoing attachment methods, the front of the caddy 80 of FIG. 5 can provided with a loop or recess 84 to receive the hook 74. Alternatively, the securing cord 76 can be brought completely around the articles being secured and hooked in the receiving hole 78. Alternate methods of securing the cords will be evident.

The interior of the caddy 10 can also be used to hang files. In order to prevent the file holders from interfering with other uses for the caddy 10, the holder pairs 120 and 130, illustrated in FIG. 9, or other file holders disclosed herein, are stored in the base 140 of the caddy 10. The holder pair 120 and 130 are each made up of a caddy portion 122 and 132 and a file portion 124 and 134. Although the file holders can be manufacture as a single unit, as disclosed hereinafter, in some applications the dual units are advantageous. Modifications to the base 140 of the caddy to accommodate other hanger designs or items will be evident. As can be seen from FIGS. 11 and 12, the caddy portion 122 and the file portion 124 of the holder set 120 lock together to form the completed holder set 120 of FIG. 10. The locking method illustrated herein is through the interaction of the U-shaped member 123 on the caddy portion 122 and reverse U-shaped member 125 on the file portion 124. The top plate 127 of the caddy portion 122 is placed over the rim of the caddy 10 with the back support 129 on the outside of the caddy 10. It is critical that the exterior support 129 have sufficient length to provide the support required to maintain the top plate 127 adjacent to the rim of the caddy 10. The reverse U-shaped member 125 and the U-shaped member 123 are dimensioned to interlock with one another to provide the support required to securely hang files. Too close a fit between the two members will make the system difficult to use while too loose a fit will cause the two members to separate unintentionally. This is one example of a method to interlock the holder set 120 and other methods and designs will be evident to those skilled in the art. To provide security and stability, the caddy portion 122 and the file portion 124 should interlock along their length. The material of manufacture must be a metal, plastic or other material that can bear the weight of the files and will not otherwise deform. The ends 150 of the file portion 124 are preferably closed in order to prevent the hanging file folders from sliding off the ends, however in some embodiments the ends can be left open.

Since the hanger pairs 120 and 130 are preferably recessed into the caddy base 140, to prevent obstruction of the caddy base 140 during other uses, finger holes 128, 126, 136 and 138 are provided. Theses recessed areas enable the user to contact the end of the hanger pairs 120 and 130 and remove them from the base 140. The depth of the recesses should be sufficient to enable the hanger pairs 120 and 130 to recess fully into the base 140 and can be maintained within the base through flanges, friction fit, or other means known in the art.

Figure 18:
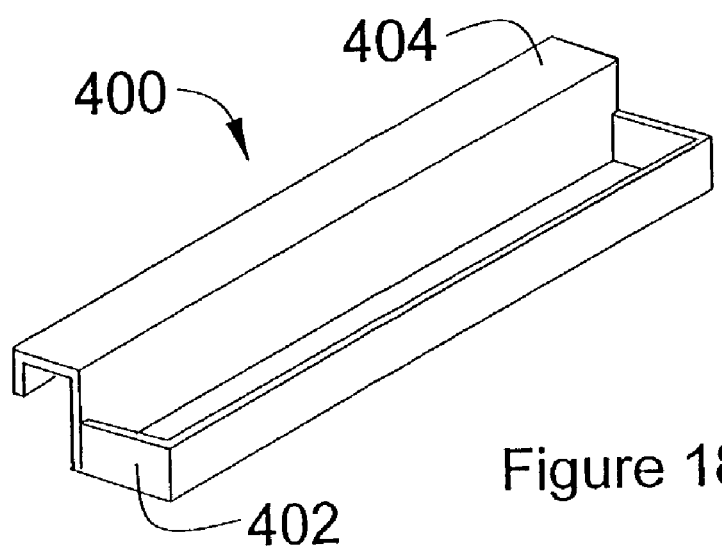
FIG. 18 is a perspective view of an alternate one-piece file holder.

In FIG. 18 an alternate hanging file folder holder 400 is disclosed that is a single molded piece that is secured to the caddy by placing the body 404 over the edge of the caddy. As noted heretofore, the design of the body 404 must be such that it accommodates the hinges of the caddy. In this preferred embodiment, as well as other disclosed hanger embodiments, to enable the hanger to easily fit over the side of the caddy, approximately ½ to ¾ inch must be left between the caddy edge and each end of the hanger. In the hanger 400 the ends of the hanger body 404 have been closed using end plates 402, thereby preventing the hanging file folders (not shown) from sliding off the ends of the hanger 400.

Figure 19:
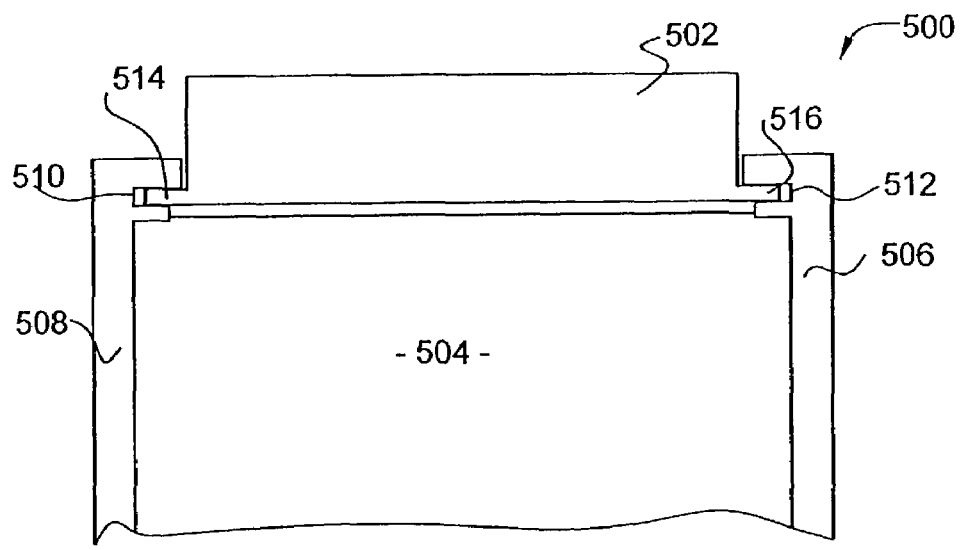
FIG. 19 is a front view of an alternate attachment method for the container using a flanged container and channels within the caddy.

An example of the slide arrangement is illustrated in the alternate embodiment of the caddy 500 of FIG. 19. In this embodiment the back panel 506 and front panel 508 are each provided with a receiving channel 512 and 510 respectively. The container 502 is, in turn, manufactured with flanges 514 and 516 that interact with the receiving channels 512 and 510. In order to enable the container 502 to slide into the channels 512 and 510, the back panel 506 and front panel 508 must be raised a sufficient distance to enable the container 502 to clear the hinged side panels 504. The container 502 is then free to slide in and out of the channels 510 and 512. Because of the folding features of the sides 504, the receiving channels 510 and 512 are most effective when placed on the back panel 508 and front panel 506.

In the embodiment of FIGS. 20 and 21, the container 252 is connected to the caddy lip 254 through two hinge pairs consisting of first hinge portions 2588 and 260 and second hinge portions 262 and 264. It should be noted that although two hinge pairs are illustrated herein, as many or as few as required to provide the appropriate attachment can be used. In the illustrated embodiment of FIG. 20, the container 252 is mounted on the caddy lip 254 in a ready to use position. To remove the container 252 from the caddy lip 254, the container 252 is slid to the left thereby removing the rotating pins 256 and 266 from the second hinge portion 260 and 264 respectively. Once the pins 256 and 266 are removed, the container 252 is free to be carried. To remount the container 252, the pins 256 and 266 are aligned with, and slid into, the second hinge portions 260 and 264. As will be obvious to those skilled in the art, the direction of movement or portion of hinge that retains the rotating pin is irrelevant and additional designs and configurations will be evident.

Figure 22:
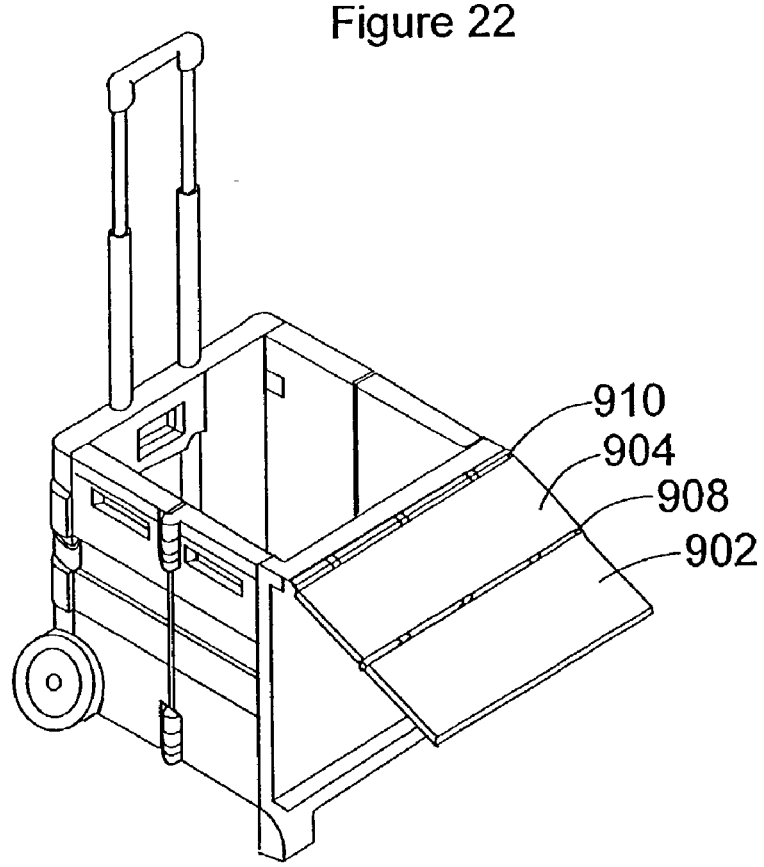
FIG. 22 is a perspective view of the disclosed caddy with a center hinged, two piece lid.
Figure 23:
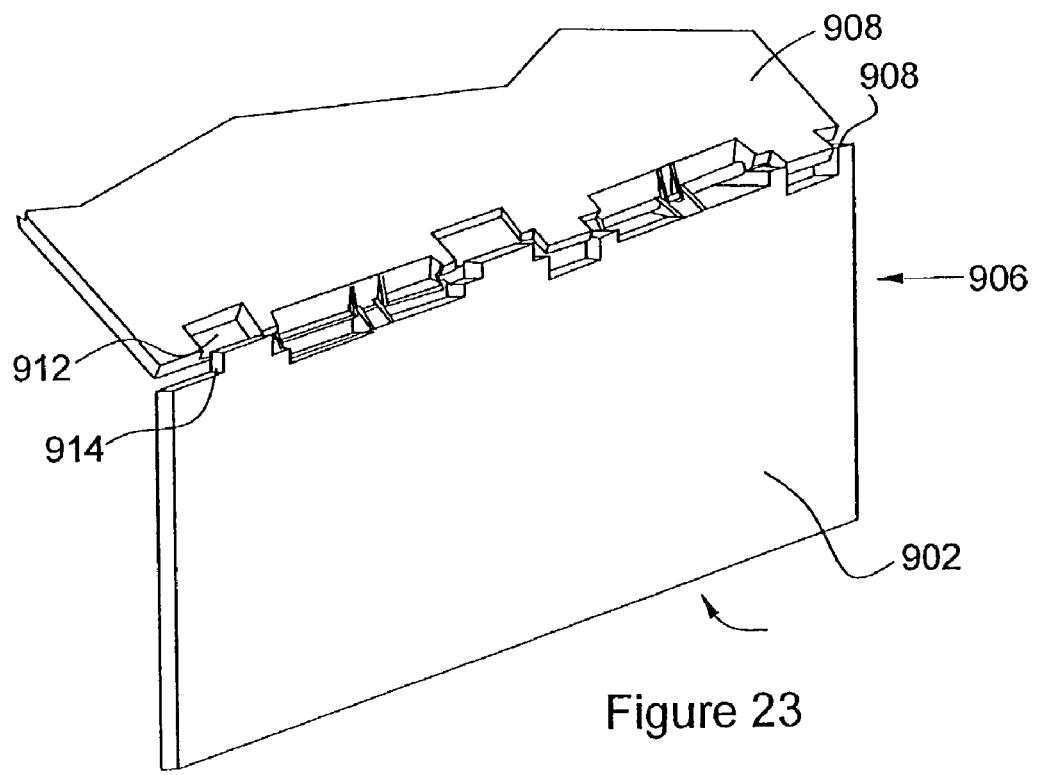
FIG. 23 is a perspective view of the hinged top of FIG. 22.

In FIGS. 22 and 23 the caddy has a center hinged top 906 that consists of forward section 902 and rear section 904 joined by hinge 908. In this embodiment, the forward section 902 can be opened back onto the rear section 904 enabling the user to only open half of the top 906. The hinge 908 as illustrated provides for an interlocking security through the interaction of the peaks 914 and opposing valleys 912. This, or any other applicable interlocking method, prevents the hinge 908 from collapsing inwardly and preferably provides sufficient strength to enable the center hinged top 906 to serve as a seat. The center hinged top 906 is hinged to the caddy body at hinge 910 in accordance with any of the disclosed methods. It should be noted that although the center hinged top 906 is illustrated as a single layer top, the container as disclosed heretofore, can also be hinged in the same manner.

Figure 24:
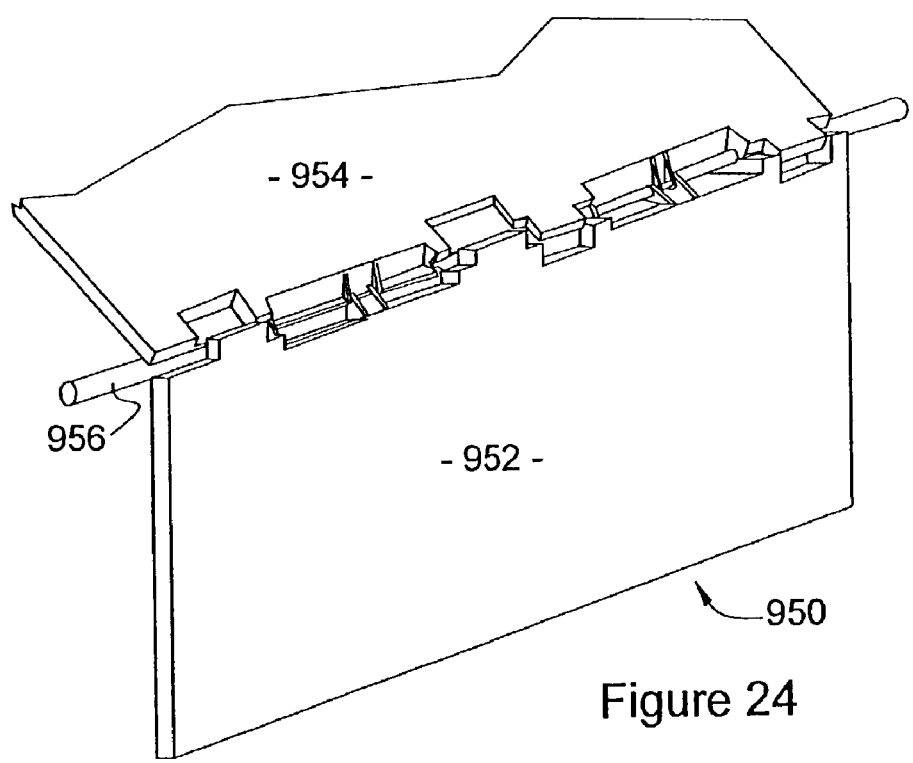
FIG. 24 is a perspective view of an alternative hinge system for the hinged top.

In FIG. 24 an alternate hinge top 950 is disclosed that includes a center bar 956 as part of the hinge system. In this embodiment, the center bar 956 extends beyond the forward section 954 and rear section 952 to interact with receiving notches placed in the caddy. This enables the hinge top 950 to be snapped in and out and permits both the forward section 954 and rear section 952 to be opened separately. It should be noted that the illustrated hinges are examples and any type of hinge that will meet the criteria set forth can be used.

Figure 25:
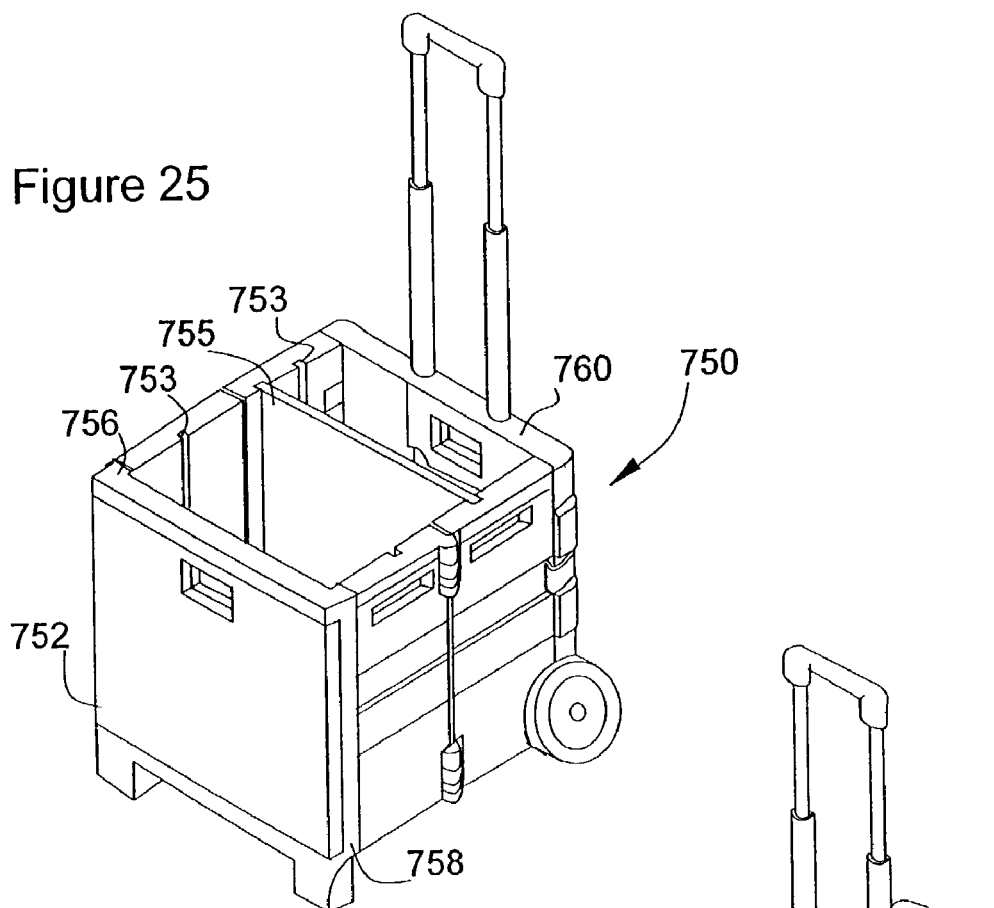
FIG. 25 is a perspective view of the disclosed caddy containing slide in dividers and a non-container lid.

The caddy 750, as illustrated in FIG. 25, has incorporated a flat top panel, or lid, 752 rather than the partitioned container 20. The lid 752, as can any lid design disclosed herein, can be secured to the front panel 758 and back panel 760 through use of magnets, snap locks, Velcro, or other methods. The lid 752 is connected to the front panel 758 thought use of hinges 756. It should be noted that since the lid 752 does not provide cut outs to receive the handles, as disclosed further herein, the length of the lid 752 must be such it does not come in contact with the handles when closed. As noted heretofore, in order for the lid 752 to rotate the required 270 degrees, a lip 762 extends from the front panel 758 a distance equal to that of the lid 752. The hinge 756 can be multiple, smaller hinges, permanent or removable, or one long hinge extending across the entire width of the caddy 750. This is dependent upon the weight to the lid, type of hinge, end use, manufacturing costs, etc., and can be decided at time of manufacture. Additionally, in the event support braces, or other accessories, described hereinafter, are to be incorporated for the end use of a particular caddy design, the hinge may require raising from the top edge of the caddy. This can be accomplished by raising the front edge an amount equivalent to the thickness of the add on accessories. FIG. 25 also illustrates the divider channels 753 and divider 755. The divider channels 753 enable a single divider to be moved or multiple dividers to be incorporated within this or any of the caddys disclosed herein.

Figure 26:
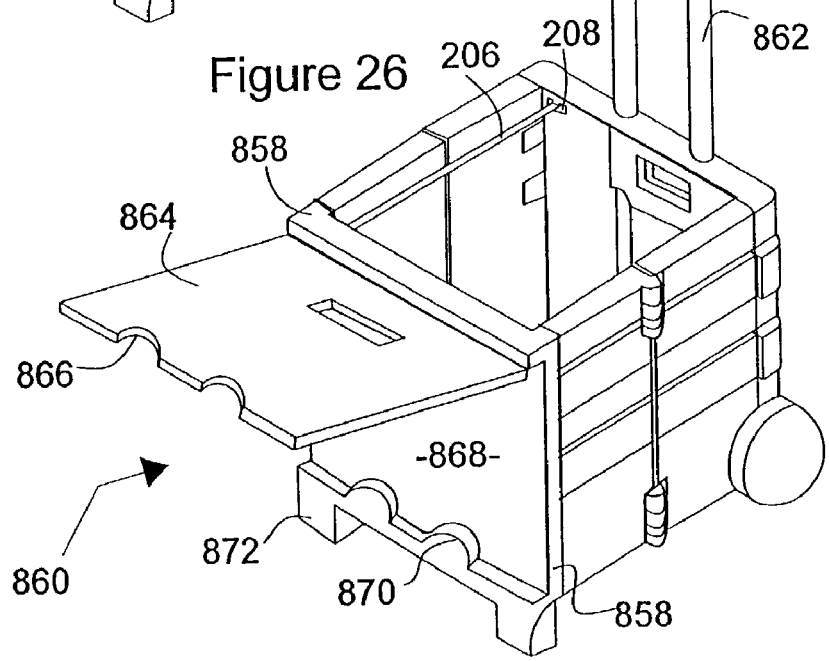
FIG. 26 is a perspective view of the caddy having a non container lid and lid receiving recess.

In the caddy 860 embodiment of FIG. 26 the lid 864 is provided with cutouts 866 that are dimensioned to fit around the handle base 862. In this embodiment, the front panel 858 has a recessed lid receiving area 868 that is also similarly provided with arcs 870 that are dimensioned to receive the cutouts 866. In this way, when the lid 864 is open, lying adjacent the receiving area 868, the front surface is flush with the base 872.

This figure also illustrates one method of retaining hanging items, such as file folders. Receiving rod brackets 208 are placed proximate each corner, spaced a sufficient distance from the sides to provide clearance for the hanging folders. File rods 206 are subsequently inserted into the rod brackets 208 and the folders placed onto the rods 206. The rod brackets can be added after manufacture or molded into the caddy. Alternatively, a hole can be drilled into one side of the caddy and a notch into the other side receive the file rod.

Figure 27:
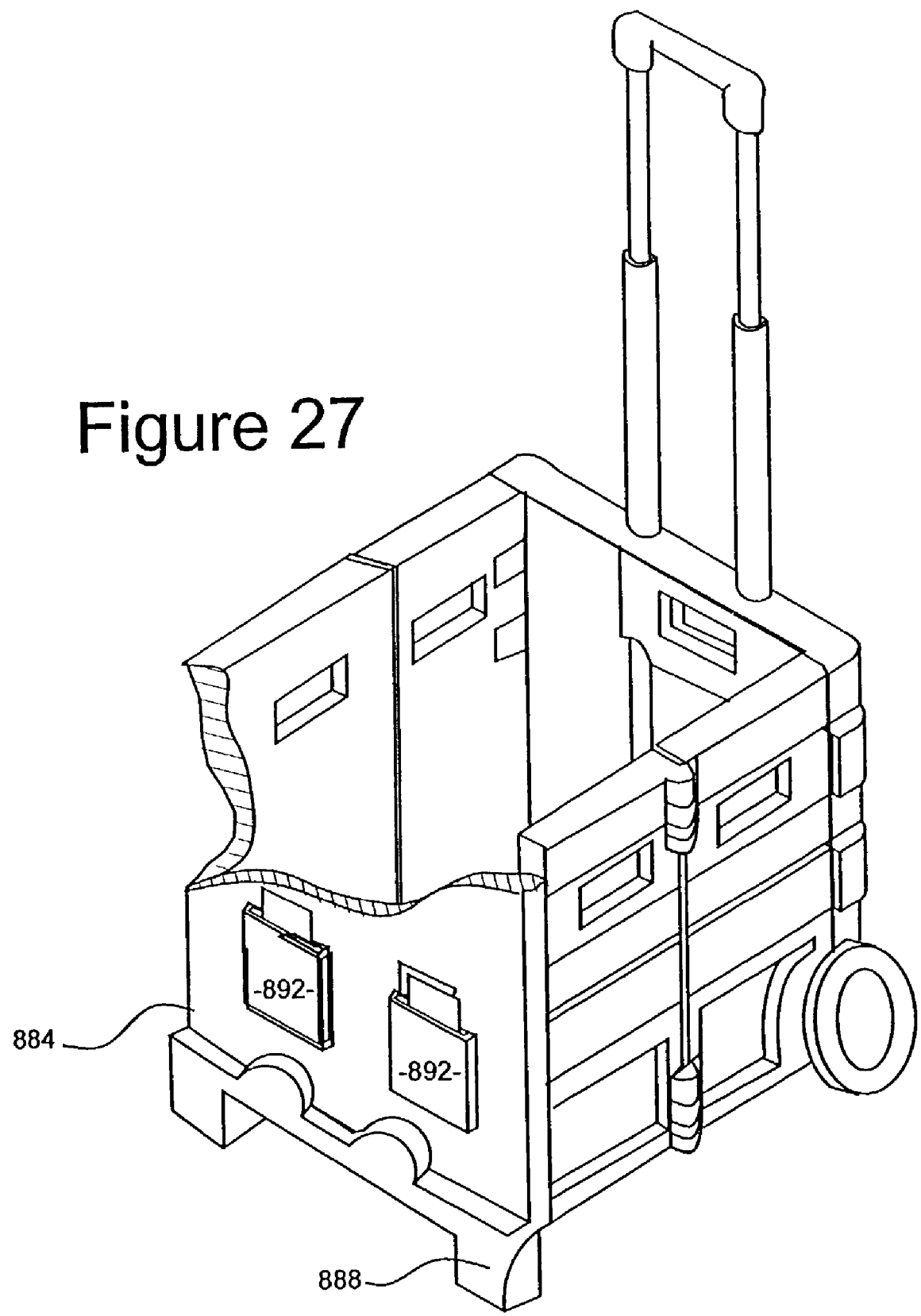
FIG. 27 is a perspective view of the caddy of FIG. 26 containing pockets within the recessed area.

Alternatively, as illustrated in FIG. 27, the lid (not shown) can be spaced from the recess area 884 as disclosed heretofore, bringing the width of the lip an amount sufficient to bring the lid in contact with the front panel 888 rather than in contact with the recess area 884. By spacing the lid from the recessed area 884, pockets 892 or other items, can be placed within the recessed area 884. The pockets 892 can be used to hold flyers, sales materials, etc.

Alternative to placing the pockets or holders directly onto the caddy, the pockets can be affixed to a snap-in panel that is placed within the recess 884. The panel can be held in through the use of receiving notches placed in the top of the panel to interact with tabs in the top of the recessed area of the front panel. Other methods of removably securing the panel into either the recessed area or onto the front panel of the caddy can be used and will be evident. One quick method of applying the panels is with magnets placed along the back of the panel. Magnetic strips, or individual magnets, can be placed in corresponding locations on the caddy to receive the panel. It should be noted that the removable panels, in any securing method, can be placed along the front, back or sides of the caddy.

Figure 28:
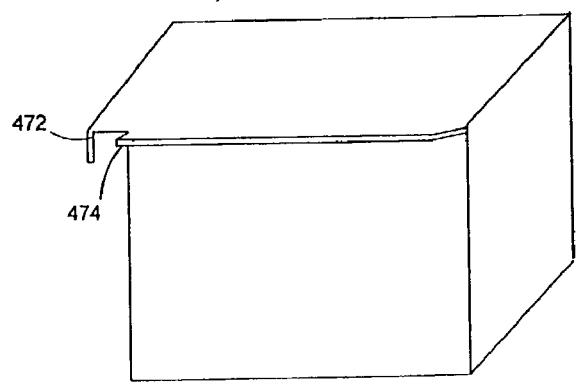
FIG. 28 is a perspective view of an insert for placement into the caddy.

In FIG. 28, a box insert 470 is provided with the L-shaped lip 472 to secure the box insert 470 to one side of a caddy. In some positions within the caddy, the support lip 474 would contact the front panel, and therefore the hinge, of the caddy. To avoid interfering with the hinge, the support lip 474 is a flat element rather than a L-shaped clip-on. The dimensioning of the lip 472 must be such that it does not interfere with the handles when placed on the back corners. The interior of the box insert can also contain dividers to section the interior. The box insert 470 can extend either the complete depth and/or width or only a portion of the depth and/or width of the caddy.

Figure 29:
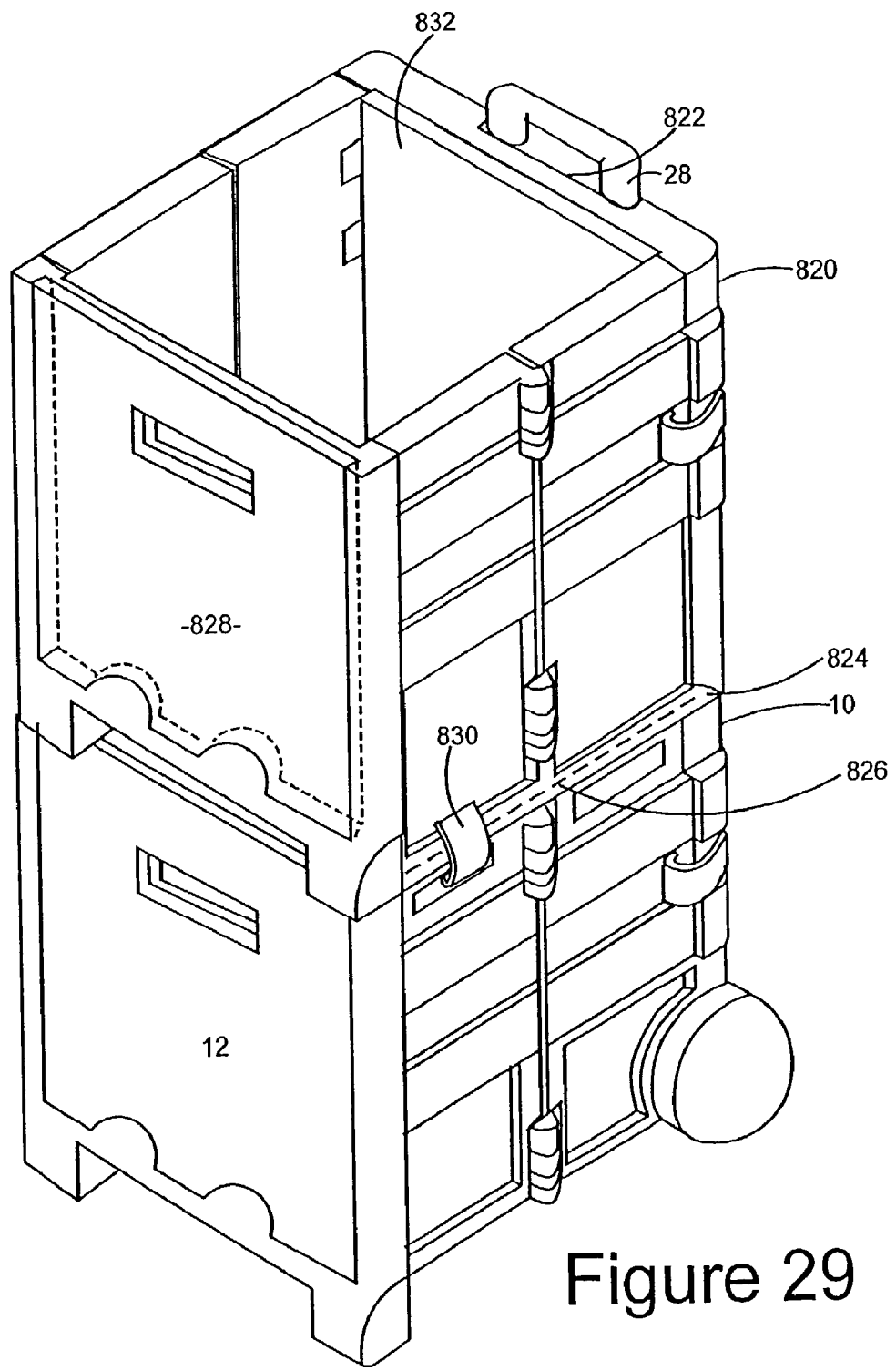
FIG. 29 is a perspective view of a stackable caddy placed into position on the wheeled caddy.

In FIG. 29 a top caddy 820 is illustrated that has been designed to interact with the foregoing wheeled caddys. Although in this figure reference is made to wheeled caddy 10, the top caddy 820 can be used with any of the wheeled caddys disclosed herein. The top caddy 820 has a flat base 824 and, in this embodiment, a recessed channel 826 that interacts with the top of the wheeled caddy 10 to help prevent slipping. The recessed channel 826 is an optional feature and the top caddy can be secured to the bottom wheeled caddy by other means. The top caddy 820 is provided with a cutout 822 that compensates for the handles 28 being recessed enables the top caddy 820 to match edges with the bottom wheeled caddy. It should be noted that in this illustration the bottom panel 832 of the top caddy 820 is left adjacent the back panel while the lid 12 is left open on the bottom wheeled caddy 10. This placement of the lid 10 and bottom panel 832 provides a double depth to the unit, enabling the storage of larger, bulkier items. However, the bottom of the top caddy 832 can be left closed to divide the unit into two separate storage areas. This figure also illustrates the locking together of the top caddy 832 and bottom wheeled caddy 10 through use of the snap clip 830. The clips 100 can be either loose clips that fit into notches placed into the forward or rearward side panels or, alternatively, the clips can be integral to one of the caddys and snapped onto the other caddy. If the clip is integral with one of the caddys, it is preferably the top caddy since the clip would only be used when securing one daddy to another.

As can be seen from this figure, the handles 28 extend a sufficient distance beyond the top caddy 820 to enable the user to easily maneuver the combined units. More than one top caddy 820 can be placed on the wheeled caddy 10, with each top caddy 820 being attached to the lower caddy through use of snap clips 830. The handles 28 would be extended to a length sufficient to clear the top stacking caddy 820 to enable the user's hand to comfortably grip the handle 28.

One method of maintaining the top caddy adjacent the handles 574 of the bottom caddy and to accommodate handles having top grips, is illustrated in FIG. 30 wherein the top caddy 570 has a molded receiving space 578 dimensioned to receive the handles 574. A door 572, hinged to the caddy 570 through the use of any applicable hinge 576, opens to receive the handles 574 and then snap locks into the closed position. The method of maintaining the door closed can vary and will be known in the art. In FIG. 31 the receiving area 606 is further provided with notches 602 extending at least most of the height of the caddy 600. A panel 604 is dimensioned to slide into the notches 602 once the handles 608 are within the receiving area 606.

When the caddy is used for outdoor activities, the wheels can be enlarged to make rolling over rough ground easier and rubber wheels can be used to further enhance movement over rough ground. The wheeled caddy is advantageous for camping enabling a user to easily transport miscellaneous items from the car to the campsite. When used in outdoor situations, covers are placed over the caddy to protect the contents.

Figure 32:
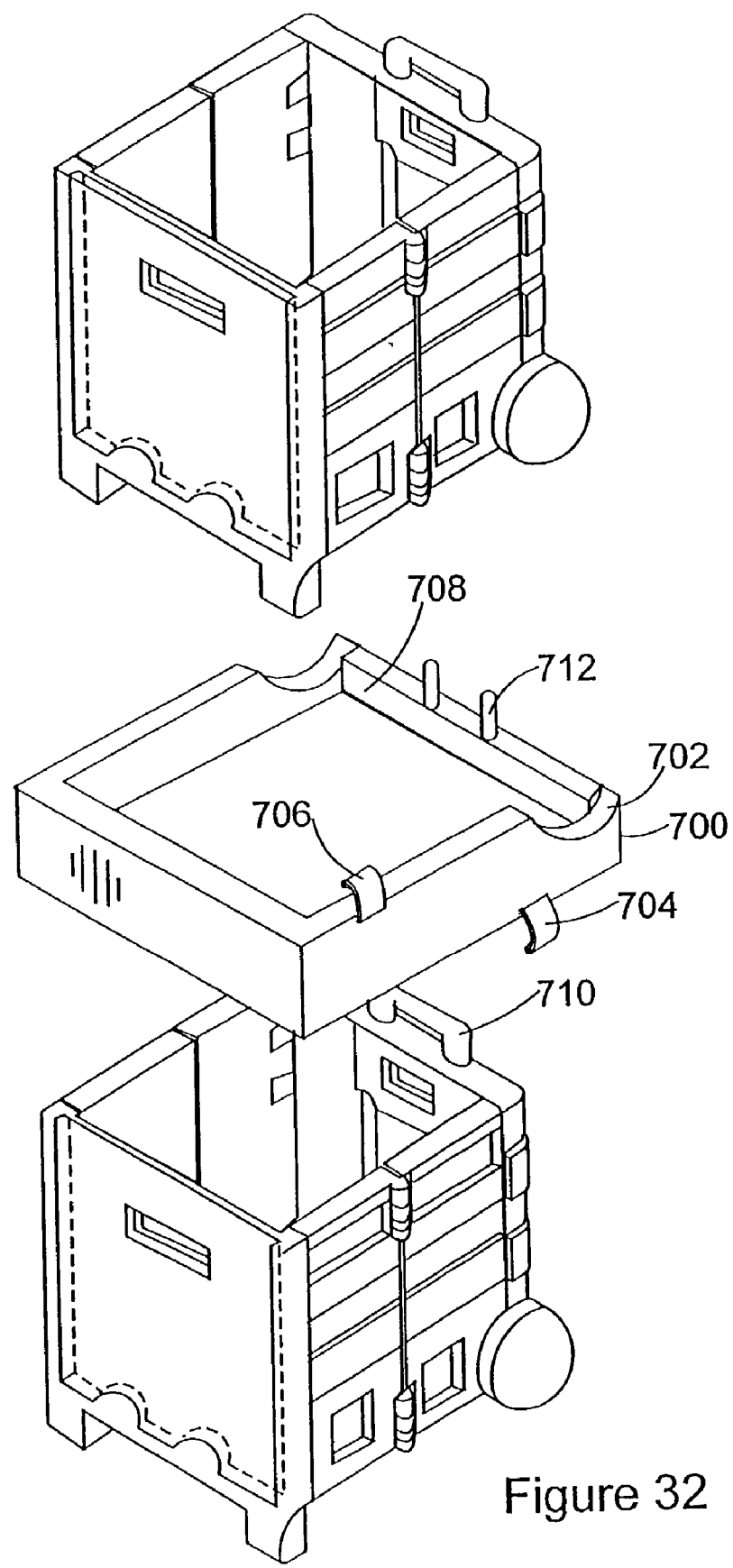
FIG. 32 is a perspective view of a separator to enable wheeled caddys to be stacked.

In FIG. 32, a caddy separator 700 is illustrated to enable two wheeled caddys to be stacked. The separator 700 has wheel wells 702 that are dimensioned to receive the wheels of the top caddy. The separator 700 is locked onto the two caddys through use of snap clips 704 and 706. The snap clips 704 and 706 prevent lateral movement between the two caddys, as well as preventing separation. The handle storage area 708 must be dimensioned to receive the handle 710 of the bottom caddy. Once locked, the handle of the top caddy can be used to roll the combined unit. Aligning tabs 712 can also be provided to interlock with the top caddy and provide additional support.

Figure 33:
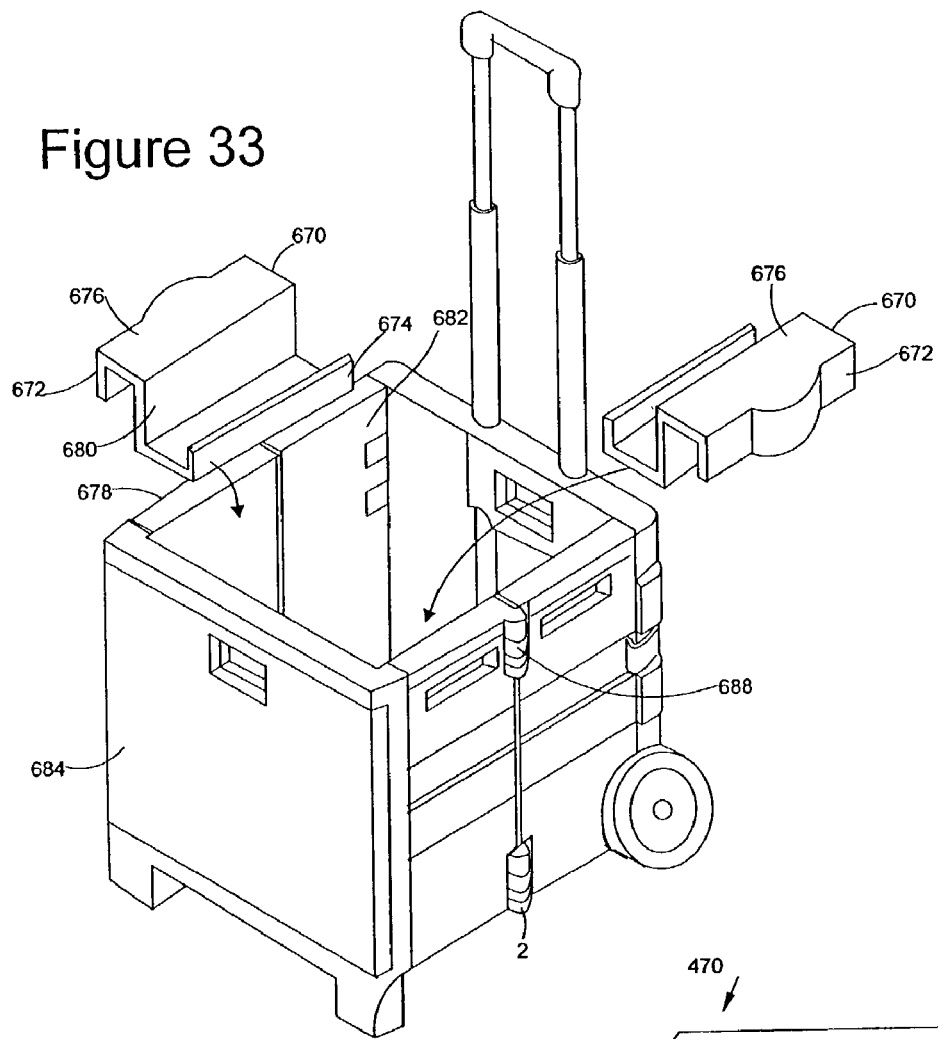
FIG. 33 is an exploded perspective view of the single piece hanging folder rails to be snapped onto the caddy side rails.
Figure 34:
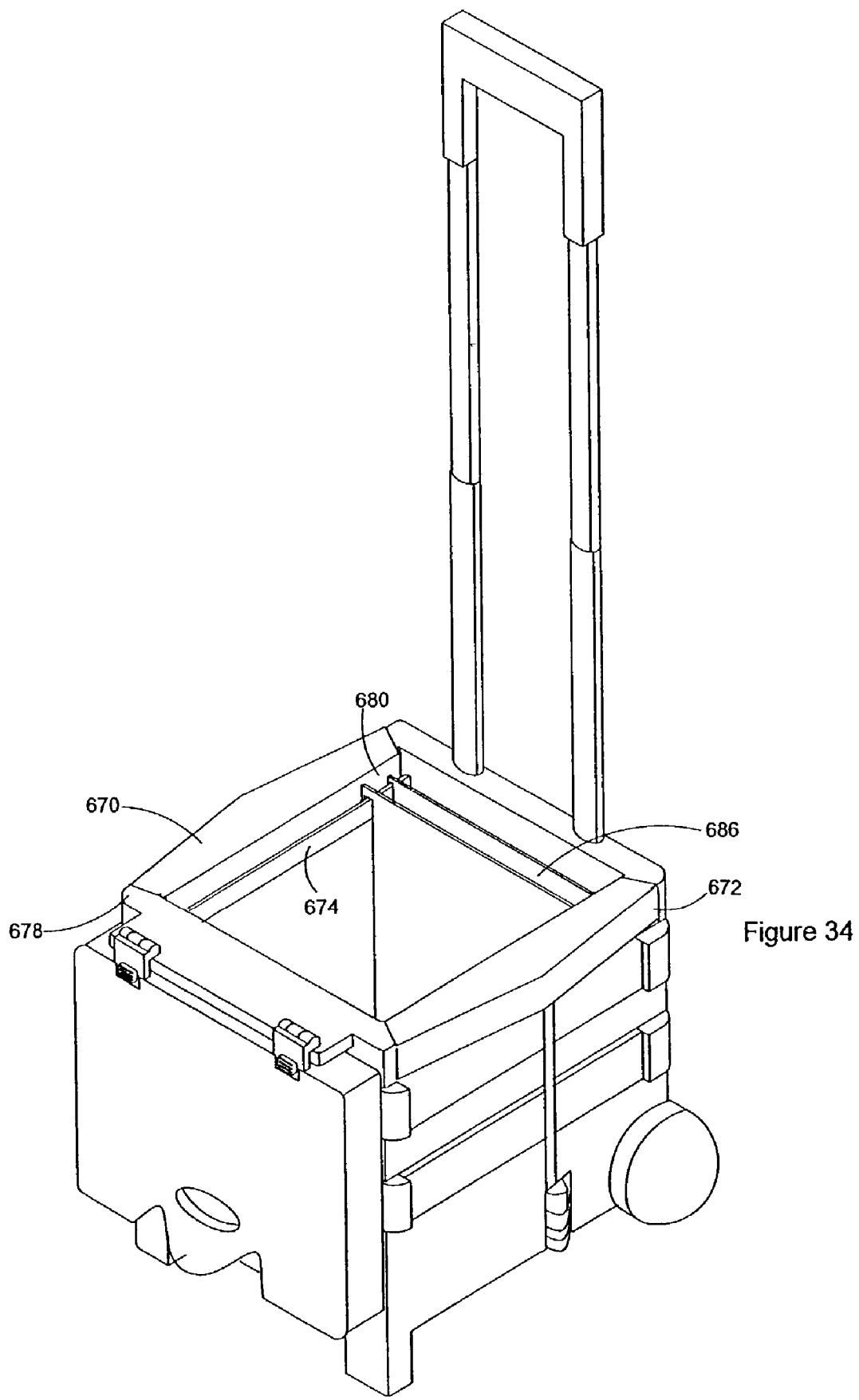
FIG. 34 is a perspective view of a caddy containing hanging folder rails with hanging file folders placed on the rails.

In FIGS. 33 and 34 a pair of hangers 670 are placed over the side panels 678 to support items, such as hanging file folders. The back support 672 of the hanger 670 must be configured to accommodate the hinges 668 to enable the top plate 676 to lie adjacent the caddy edge 678. The brackets 674 are dimensioned to receive the hooks of hanging file folders or other hanging items, although other bracket configurations can be used to support specialized items. As illustrated in FIG. 34, the back panel 680 of the hanger 670 must have adequate length to drop the brackets 674 a distance from the caddy edge 678 sufficient to enable the top 684 to close without being blocked by the hanging folders 686. As stated hereto fore in conjunction with FIG. 8, the hangers preferably have end closures to prevent the file folders from sliding off, however, other means can be used to prevent the folder hooks from sliding off.

Figure 35:
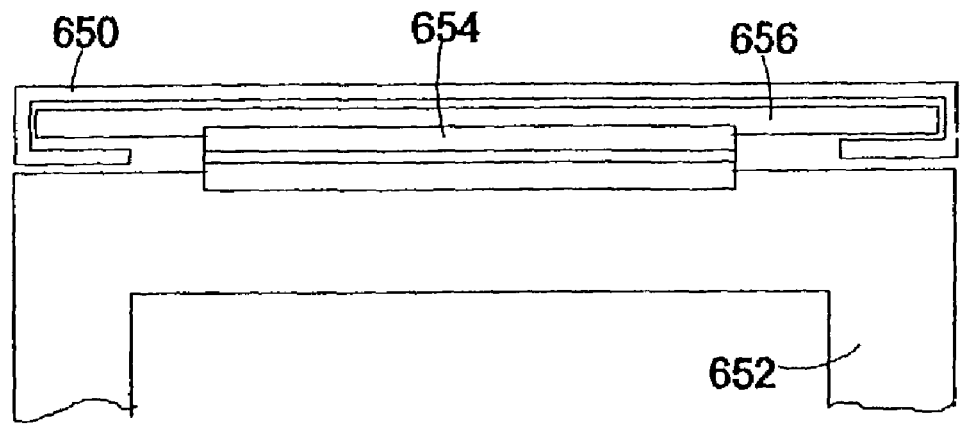
FIG. 35 is a top view of an alternate hinge design for the caddy lid.
Figure 36:
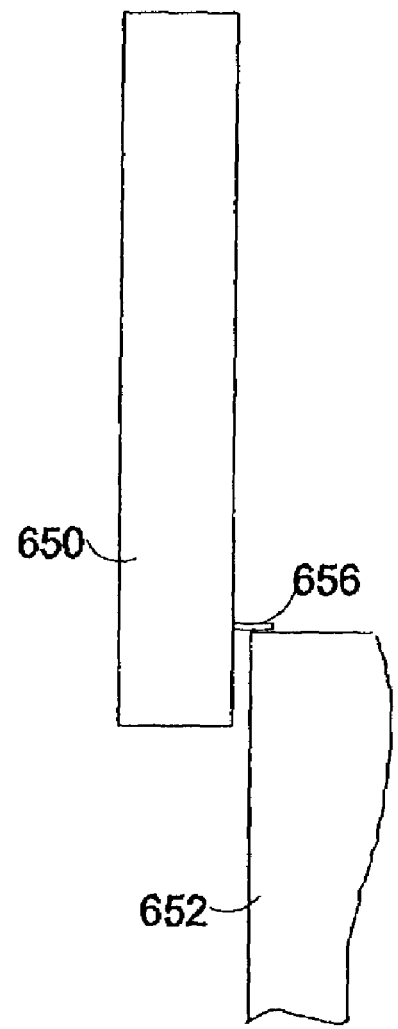
FIG. 36 is a side view of the hinge design of FIG. 35.
Figure 37:
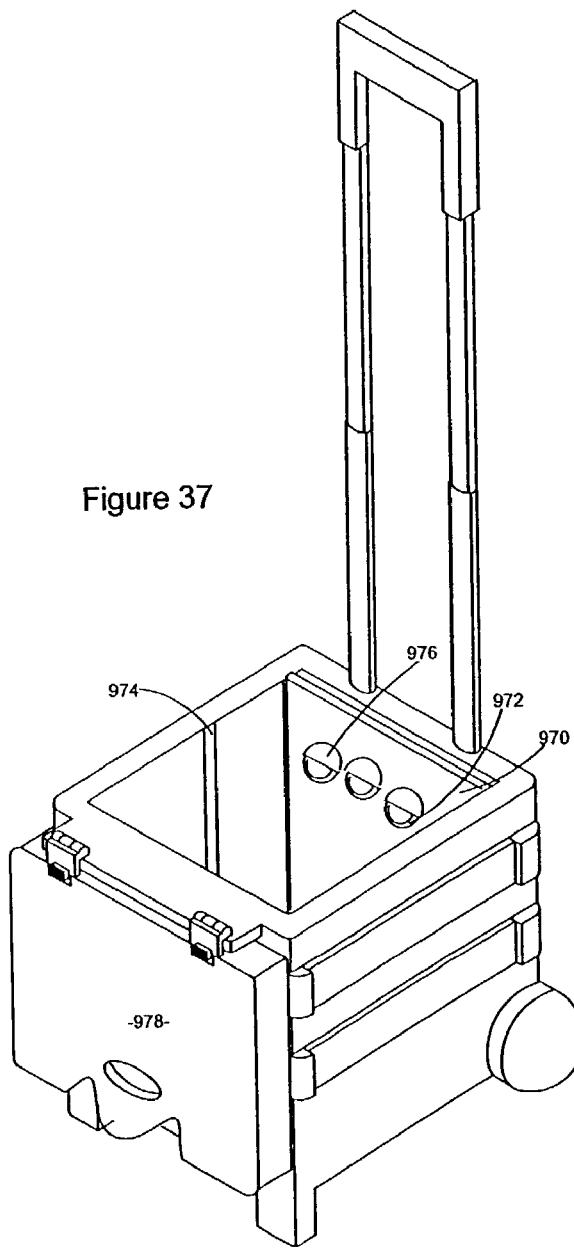
FIG. 37 is a perspective view of the disclosed caddy with a slide in panel.

In FIGS. 35 and 36 an alternative method of affixing a lid the caddy is disclosed. The caddy 652 is provided with a hinged guide bar 656 that is affixed to the caddy 652 by one or more hinges 654. The lid 650 is a modified C-shape dimensioned to slideably receive the guide bar 656. The top and bottom of the lid 1650 are closed to prevent the lid 650 from sliding off the bar 656, as well as for aesthetic purposes. The lid 650 is opened by lifting the lid 650 parallel to the caddy 652 and sliding the lid downward along the bar 656 to lie adjacent the front of the caddy 652. In FIG. 37 the panel 970 slides into channels 974 provided within caddy and described in more detail heretofore. The clips 972 are, as described heretofore, used to retain items adjacent the back panel, and can be combined with pockets as previously noted. In this embodiment, the clips 972 are provided with recess pockets 976 to maintain the clips 972 flush with the surface of the panel 970 when not in use. The clips 972 can be provided with springs that, when not being held in the downward position by items, return to the recess pocket 976. The lid 978 can, optionally, be cut to accommodate the items placed within the clips 972 and a support bar, as described heretofore, can be incorporated to provide added support. Although the fishing equipment is illustrated herein, it should be noted that the clips, pockets, etc. can be designed to hold tools, screws, electrical equipment, etc. Other type of clips or retaining methods can also be used to secure items, either removably or permanently, to the slidable panels.

Figure 38:
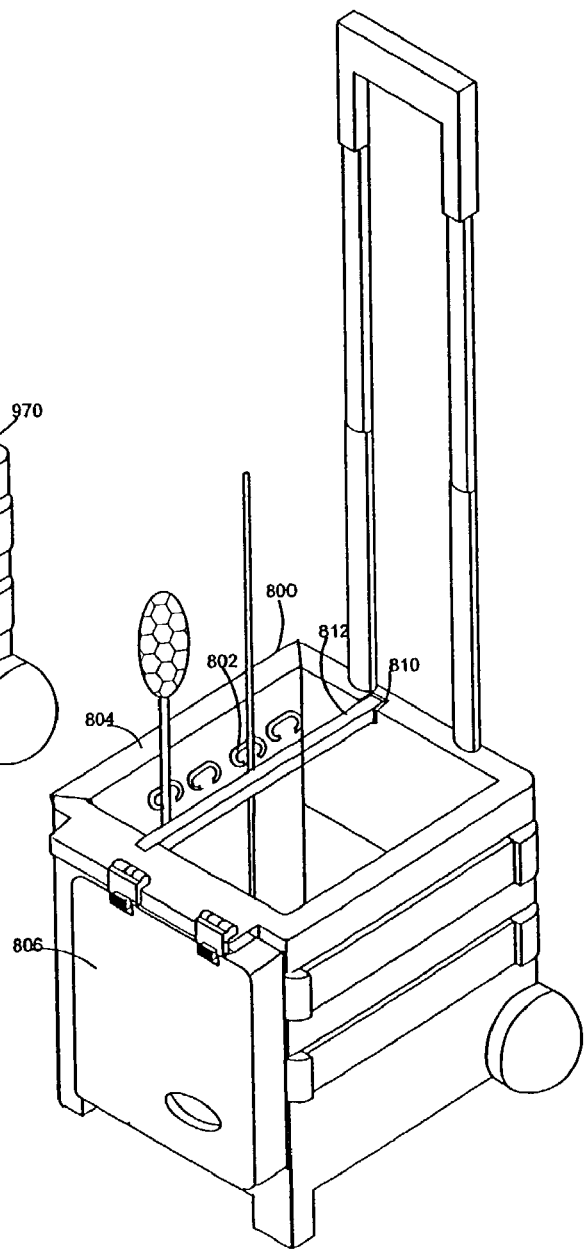
FIG. 38 is a perspective view of a caddy having a side panel, partial lid and support bar.

Another use for the wheeled caddy is for sports and camping. In FIG. 38, a panel 800 is provided with snap-in clips 802 to receive items such as fishing rods and nets. Preferably the clips 802 are paired, one located proximate the rim of the caddy, as seen, and the other proximate the bottom of the caddy (not shown). The illustrated panel 800 is affixed to the caddy through use of a L-shaped lip 804, such as used in conjunction with the hanging folders, described heretofore in FIG. 34. The L-shaped lip 804 has the same design as the top plate 856 of the hanger 850 with the back panel 860 replaced with the panel 800. Other means, such as Velcro®, can be used to secure the panels to the caddy and will be obvious to those skilled in the art. Additionally, other clip designs, loops or other holding members for attaching a variety of items to the panels can be use. The lid 806 is, at the time of manufacture, proportioned to provide clearance for the items being held by the panel 800. In some embodiments, the lid would either be cut away on both sides to enable an additional panel 800 to be placed on the opposing side of the caddy, enabling both panels to carry tall. The panels can also contain pockets, snaps, Velcro® or other storage and/or attachment members, either alone or in combination with the clips 802. A snap-in front panel as disclosed heretofore can be modified to hold the appropriate items, such as lures and bait. The modification of the snap-in panels and panels 800 also enable the same basic caddy to be used for various activities. Additionally, a cooler can be placed in the caddy to store items that need to remain cool.

When the lid is cut back to accommodate tall items, the strength of the lid is compromised and is not as safely used as a seat. Therefore, a removable support rod 812 should be incorporated to provide support to the lid 806 when closed. It is preferable that notches 810 are provided in the sides to receive the support rod 812, thereby keeping the lid flush with the back and hinge arrangement. For ease of illustration, the support rod 812 of FIG. 38 is positioned on the side opposite the cutaway portion of the lid 806. In actual use, the rod 812 would be placed at the cut edge to give the support usually provided by the caddy edge.

Figure 40:
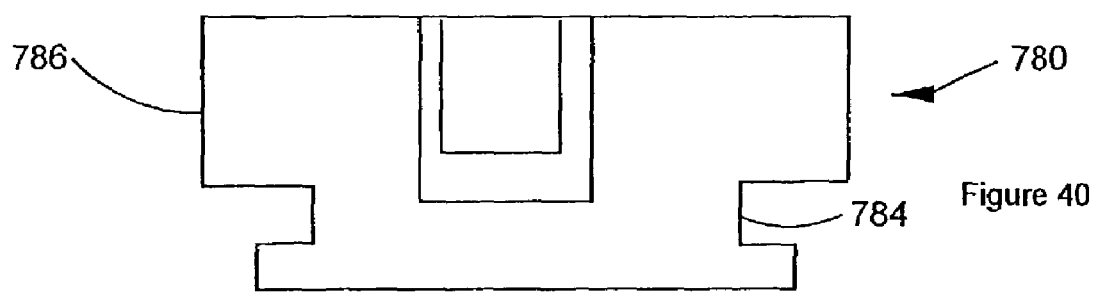
FIG. 40 is an side view of a container for use with the caddy of FIG. 39.
Figure 39:
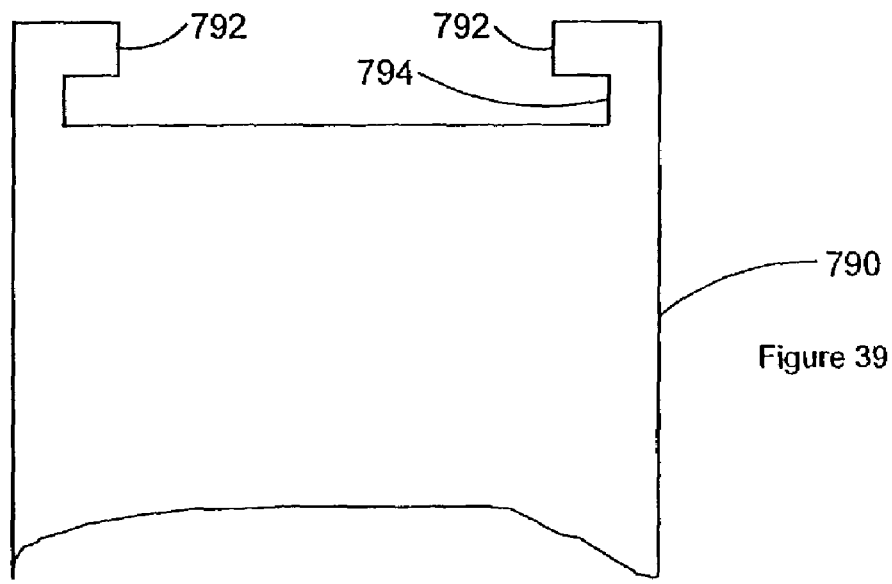
FIG. 39 is a side view of an alternate embodiment the caddy having container receiving channels.
Figure 41:
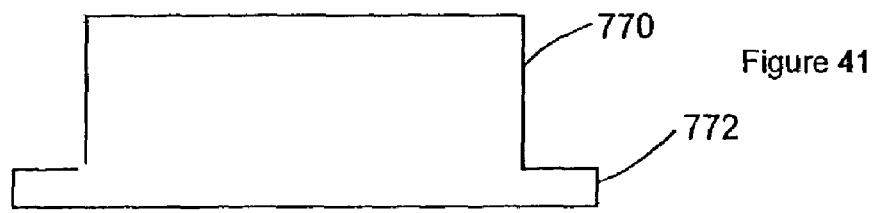
FIG. 41 is a side view of an alternate container for use with the caddy of FIG. 39.

In FIG. 39 the caddy 790 is provided with a slide channel 794 formed by L-shaped lips 792. The slide channel 794 is dimensioned to receive the flanges 772 as illustrated on box 770 of FIG. 41. Alternatively, as illustrated in the box 780 of FIG. 40, the flange 772 can be replaced with channels 784 to interact with the L-shaped lips 792. Although a box is illustrated in these figures, the slide channel/flange combination can be incorporated with any add-on. The channels 784 can be molded into one or more of the four sides of the caddy, dependent upon final use. Further, either of the boxes 770 or 780 can be dimensioned to interact with the interior channels as described heretofore.

Figure 42:
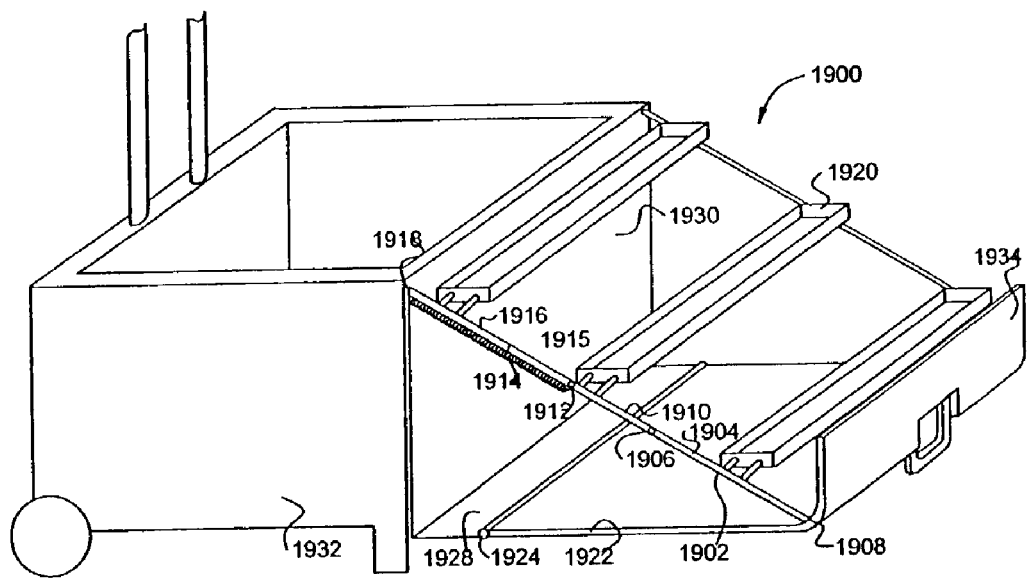
FIG. 42 is a perspective view of an alternate embodiment having a pull out storage box.
Figure 43:
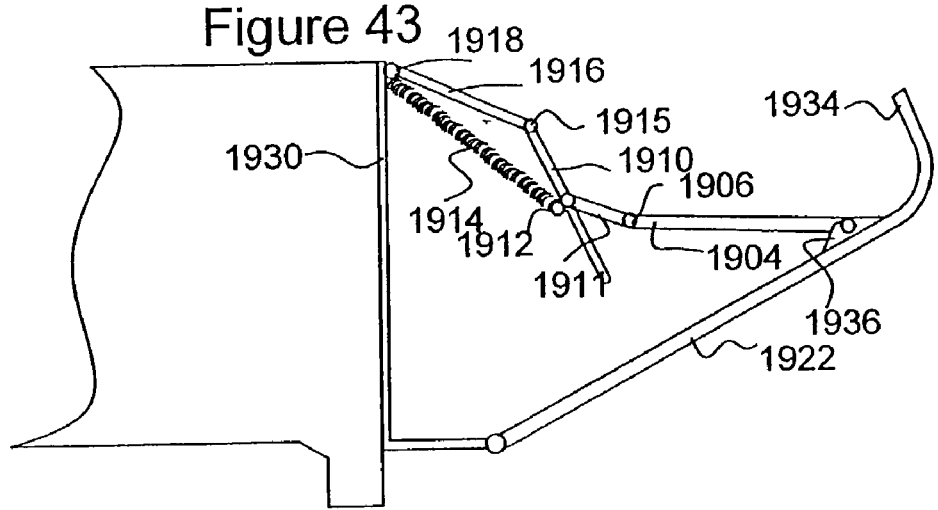
FIG. 43 is a side view of the pull out storage box of FIG. 42
Figure 44:
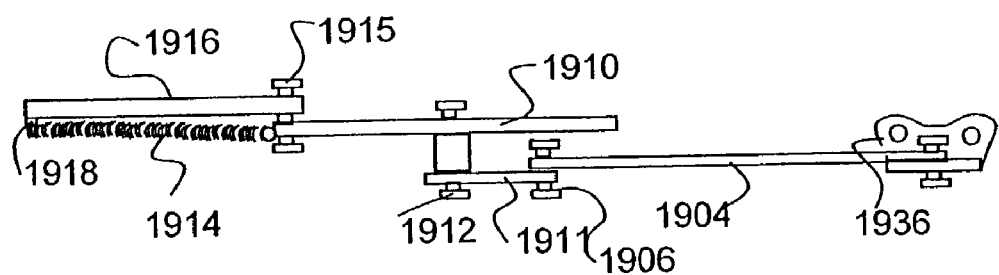
FIG. 44 is a top view of and example of the hinge mechanism for use with the pull out storage box of FIG. 42.

In FIGS. 42–44, the pull down storage box 1900 is either permanently or removably secured to the front of the caddy 1932. The back panel 1930 can be provided with channels or flanges, as disclosed heretofore, which enables the box 1900 to be easily mounted and removed. The floor 1928 and the lid 1934 must have a width slightly greater than the trays 1920 to enable the front panel 1922 to close securely. The front panel 1922 is hinged to the floor 1928 through use of hinge 1924. The trays 1920 are secured to multiple, hinged, support bars that enable multiple trays 1920 to vertically align, or stack, against the back panel 1930.

The front bar 1904 is pivotally connected at one end to the lid 1922 through use of bracket 1936. The other end of the front bar 1904 is connected to the short bar 1911 at the pivot 1906. The short bar 1911 is pivotally connected at the pivot 1912 to the mid bar 1910, which in turn is connected to the back bar 1916 at pivot 1915. The back bar 1916 is also pivotally connected to the back panel 1930 at the pivot 1918. A spring 1914 is affixed to the back panel 1930 proximate the pivot 1918, and to the mid bar 1910, either at or proximate the pivot 1912. The spring 1914 assists in bringing the mid bar 1910 toward the back panel, thereby enabling the lid 1922 to close more easily.

In the closed position, the back bar 1916 and mid bar 1910 lie inline, flush with the back panel 1930 while the front bar, 1904 is placed adjacent the back bar 1916. The trays 1920 must, therefore, be positioned to enable the trays 1920 affixed to the front bar 1904 to fit between the trays affixed to the back bar 1916.

Figure 46:
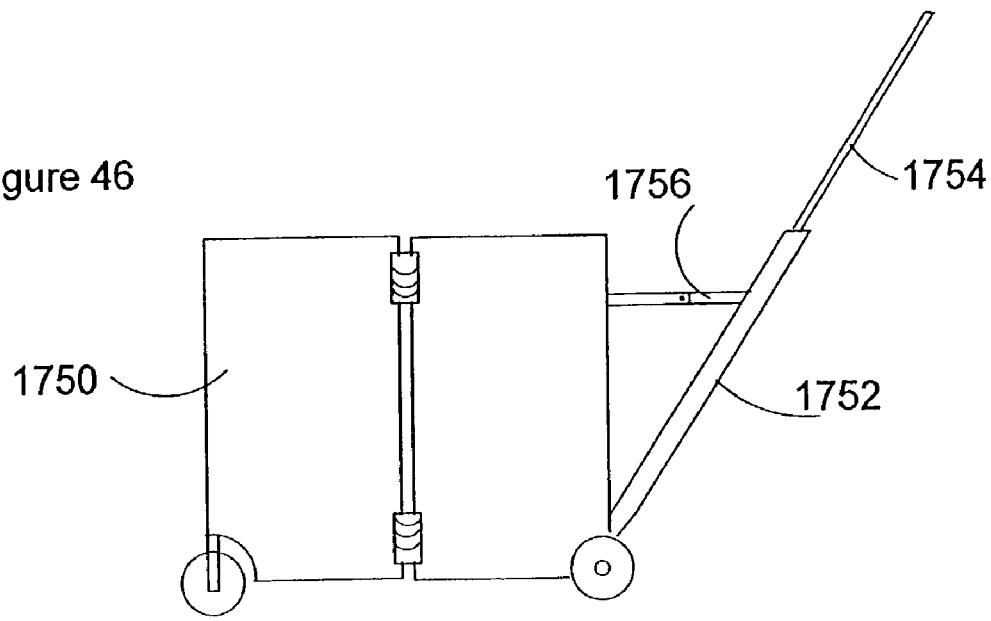
FIG. 46 is a side view of a front wheeled caddy having an pull-out handle system.
Figure 45:
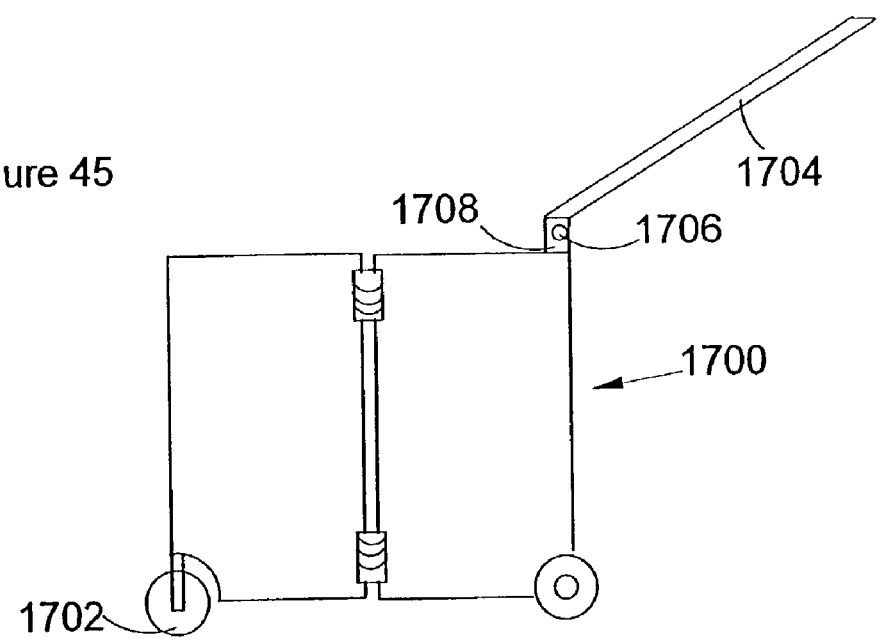
FIG. 45 is a side view of an alternate caddy having front wheels and an angled handle.

In FIG. 45, the caddy 1700 has pivotable front wheels 1702 have been added to enable the caddy 1700 to be easily pushed. In order to facilitate pushing the caddy 1700, the upper handle 1704 is rotated at the joint 1706. The joint, or pivot 1706 enables the upper handle 1704 to rotate in relation to the bottom handle 1708 while still enabling the handles 1704 to telescope into the bottom handle 1708 when released from the joint 1706. This pivoting motion can be accomplished through any means known in the art, such as used on bicycle seats, or any mechanism providing equivalent rotation. In FIG. 46, the caddy 1750 has a second back panel 1752 that carries the handles 1754. The second back panel 1752 is prevented from separating from the caddy 1750 more than the predetermined distance by a connector 1756. The connector 1756 can be two rotating bars that collapse as the second back panel 1752 is brought adjacent the caddy 1750, or other connectors such as a chain, rope, etc. The connector 1756 must recess into either the caddy 1750 or the second back panel 1752 in order to enable the second back panel 1752 to lie flush with the caddy 1750. A locking member of a type known in the art, maintains the second back panel 1752 in the vertical position.

In FIG. 47 a fishing, or small tool, box 1850 is added to the back of a wheeled caddy. The box 1805 can be added either to the front or back of the caddy on a permanent basis or as a removable element. The box 1850 is provided with a hinged brace 1856 that folds into the box casing 1858 as the lid 1854 is closed. The trays 1852 rotate on the brace 1856 during opening and closing to enable the contents to be maintained within the trays. The box 1850 can be sized to either take the maximum amount of space available on the caddy or can be a partial unit. In the illustrations herein, the box 1850 is illustrated on the back of the caddy, however the box can also be placed on either the front or front and back of the caddy. The trays 1852 must be spaced to permit the trays 1852 to nestle within one another to permit the lid 1854 to close. The pull down trays are known in the fishing box art and modification of the design will be obvious to those skilled in the art.

In FIG. 48, there is an alternate design for receiving the handles within the top caddy. Rather that the previously disclosed cutouts of caddy 820, the receiving area is provided with flanges 1120 that are parallel, and spaced from, the back wall 1124. Alternatively, the flanges 1120 can be replaced with a secondary wall to form a channel to receive the handles. It should be noted that the stationary wall, either partial or complete, will only be applicable for use with handles that do not have the plastic coated grip used with handles 1122. The grip, commonly used in the art, extends the diameter of the handle grip beyond that of the vertical, telescoping bars. Therefore, when the flanges 1120 are spaced a sufficient distance from the back wall 844 to receive the handle grip, the back wall 1124 to flange 1120 distance is to great to prevent movement of the caddy. To prevent lateral movement of the caddy, the distance between the back wall 1124 and the flanges 1120 much be only slightly greater than the diameter of the handles 1122.

An additional method of maintaining the top caddy in place and adjacent the handles 1506 is illustrated in FIG. 49 wherein clip 1500, rotating aroung hinge or picor 1505, locks the top caddy to the handles 1506. In this embodiment, the clip 1500 is provided with a handle 1504 to facilitate opening and the locking mechanism is internal at the connection between the caddy 1502 and the clip 1500. Other clip designs will be apparent to those skilled in the art.

In FIGS. 50–52 an alternate method is shown for storing the two piece file holders 120 illustrated in FIGS. 11, 12, as well as the one piece file holder 400 of FIG. 18. The hanger insert 1000 is illustrated in FIG. 50 without the center retaining bracket 1020 in place. The insert 1000 is designed with two receiving slots 1002 and 1004, each of which is "stepped" down from an upper platform 1006 and 1008 to a lower platform 1010 and 1012. Dividing receiving slot 1002 from slot 1004 is a center brace 1014 that has a notch 1016 proximate the center point. Within the notch 1016 is a protrusion 1017 that has a height less than that of the center brace 1014. The hanger insert 1000 is able to accommodate for the two piece file holders 120 and the one piece holder 400 because of the stepped down from the upper platform 1006 and 1008 to the lower platform 1010 and 1012. For convenience the interaction between the file holders 120 and 420 will be described in relation to only receiving slot 1002, as the units are mirror images and describing both would be redundant.

When the two-piece file holders 120 are placed into the insert 1000, the caddy portion 122 is placed in the upper platform 1006 and the file portion 124 in the lower platform 1010. The dimensioning between the upper platform 1006 and the lower platform 1010 must be about the distance from the top plate 127 to the base of the file portion 124 to enable the file holders 120 to sit flush on the platforms 1006 and 1010. Preferably the width of the dimensioning 1006 and 1010 are such that the caddy portion 122 and the file portion 124 of the file holders 120 can interlock, as illustrated in FIG. 12, while seated within the receiving slot 1002. However, in the event the design of the caddy and holders is such that this depth cannot be achieved, the caddy portion 122 and the file portion 124 can be slid in the partially locked position to reduce the depth.

The hanging file folder holder 400 of FIG. 18 is dimensioned to be received within the receiving slot 1002 in the same manner as described above. The upper portion of the body 404 is placed on the upper platform 1006 while the lower portion of the body 404, designed to receive the file holders, is resting on the lower platform 1010. When designing the receiving slots 1002 and 1004 to receive either the two-piece holders 120 or the single piece holder 400, the depth of the single piece holder 400 must be considered with greater care than that of the two-piece holder 120 as there is no flexibility with the single piece.

To maintain the file holders 120 and 400 within the insert 1000, a retaining bracket 1020, as shown in FIGS. 51 and 52, is snapped into place. The underside of the retaining bracket 1020 is illustrated in FIG. 52 wherein the guides 1022 and the receiving hole 1023 can be seen. The guides 1022 are dimensioned to fit within the U of the file-receiving portion of the holder. The width and placement of the guides 1022 can dimensioned to create a friction fit between the file holder and either the center brace 1014 or the wall of the upper platform 1006 or 1008. The receiving hole 1023 is dimensioned to be removably affixed to the protrusion 1017 through use of a snap fit, a release button or other means known in the art. The retaining bracket 1020 maintains the file holders 120 and 400 within the receiving slots 1002 and 1004 when the caddy is in the folded position.

It should be noted that the caddys can be of any size that is convenient for end use. A height of six (6) inches may be appropriate for transporting lab beakers while a height of two (2) feet would be appropriate for camping. Further, the handle height can be adjusted to enable any number of caddys to be stacked.

The examples herein are no intended in any way to limit the scope of the invention and it should be noted that any of the features can be combined, although not illustrated in conjunction with one another herein. The combination of features, alterations in materials and redesign of disclosed elements to fit a specific purpose will be evident to those skilled in the art.

What is claimed is:

1. A collapsible wheeled caddy having a front panel, a back panel, a first pair of wheels proximate said back panel, a first pair of vertically hinged side panels, a second pair of vertically hinged side panels, a hinged bottom panel and retractable handles within said back panel, said caddy having an outer periphery, the improvement comprising:
   a container, said container having sides and a base forming an interior having a depth, a periphery and at least one individual storage area within said depth of said interior, said at least one individual storage area having dividers to form multiple compartments
   a partially removable lid, said partially removable lid providing access to said storage area and having multiple openings to provide access to at least one of said multiple compartments, each of said openings having a closable lid,
   a lip, said lip extending beyond the plane of said front panel a distance at least equal to said depth of said container,
   at least one rotating connection member, each of said at least one said rotating connection member having a first edge, said first edge having a first length and a second edge, said second edge having a second length, said first edge being affixed said container and said second edge being affixed to said lip,
   wherein said container rotates at said rotating connection member at least 270 degrees to lie proximate said front panel in an open position and adjacent a top edge of at least one of said back panel, said first pair of side panels, and said second pair of side panels in a closed position and said depth enables articles to be stored within said interior of said container.

2. The caddy of claim 1 further comprising a second container, said second container having at least one individual storage area and dimensioned to lie adjacent to and on the same plane as said container, said second container being hingeably connected to said container, to enable said second container to rotate to lie adjacent to said container.

3. A collapsible wheeled caddy having a front panel, a back panel, a first pair of wheels proximate said back panel, a first pair of vertically hinged side panels, a second pair of vertically hinged side panels, a hinged bottom panel and retractable handles within said back panel, said caddy having an outer periphery and an inner periphery and each of said front panel, said back panel, said first pair of vertically hinged side panels and said second pair of vertically hinged side panels having a bottom rim and a top rim, the improvement comprising:

at least one securing strip, said at least one securing strip having a first edge and a second edge, said first edge being affixed at about a right angle to said front panel adjacent to said top rim, a container, said container having a first panel, multiple sides and a second panel, said first panel being rotatably connected to one of said multiple sides, said multiple sides creating a depth between said first panel and said second panel, said container having a depth equal to a distance between said first edge and said second edge, said container having a lid, multiple compartments and a handle, said first panel, said second panel and one of said multiple sides having arcs, said arcs being positioned and dimensioned to receive said handles when said container is in said closed position, at least one rotating connecting member, said at least one said rotating connecting member having a first section affixed to said second edge of said securing strip and a second section affixed to said container, said at least one rotating connecting member enabling said container to rotate at least 270 degrees, at least one storage area, a cord holder, said cord holder storing a length of cord, wherein said first panel of said container lies parallel to and in contact with said front panel in an open position and said second panel of said container lies parallel to and in contact with said top rim of at least one of said back panel, said first air of side panels, and said second pair of side panels in a closed position.

4. The caddy of claim 3 further comprising at least one pair of hangers, each of said at least one pair of hangers having:

a first member, said first member having a back plate support, said back plate support being configured to lie adjacent said vertically hinged side panels, a top plate, said top plate being at right angles to said back plate support, and a back panel, said back panel having a first end affixed, at a right angle, to said top plate and being parallel to said back support, and having a U-shaped member at a second end, a second member, said second member having a J-shaped hook member, said J-shaped hook member being dimension to rest within said U-shaped member;

an L-shaped bracket, one end of said L-shaped bracket being integral with one end of said J-shaped hook member, wherein said first member of a first of said at least one pair of hangers attaches to one of said front panel, said back panel, said first pair of vertically hinged side panels, said second pair of vertically hinged side panels and said first member of a second of said pair of hangers attaches to an opposing panel, said second member interacting with said first member.

5. The caddy of claim 3 wherein said at least one rotating connecting member is a hinge, a first portion of said hinge being affixed to said container and a second portion of said hinge being affixed to said second edge of said at least one securing strip.

6. The caddy of claim 3 wherein said first section of said at least one rotating connecting member is removable from said second section of said at least one rotating connecting member.

7. The caddy of claim 3 wherein said first section of said at least one rotating connecting member and said second section of said at least one rotating connecting member are connected by a snap lock, said snap lock having a release button to enable said first section to be removed from said second section.

8. The caddy of claim 3 wherein said first section of said at least one rotating connecting member and said second section of said at least one rotating connecting member are connected by a pin, said pin being permanently affixed within said first section of said at least one rotating connecting member and removably held within said second section of said at least one rotating connecting member.

9. The caddy of claim 3 wherein at least one of said at least one storage area is a cup holder, said cup holder having a hinged cover and a hinged cup receiving area, said hinged cover and said hinged cup receiving area rotating to about 90degrees from said at least one of said front panel, said back panel, said hinged side panels or said container, to maintain a cup in an upright position, said hinged cup receiving area being spaced from said hinged cover to enable a cup to be place within said hinged cup receiving area and supported on said hinged cover.

10. The caddy of claim 3 wherein said at least one storage area is a cord holder, said cord holder storing a length of cord.

11. The caddy of claim 3 wherein said at least one storage area has a hinged cover and collapsible sides, said collapsible sides extending from at least one of said front panel, said back panel, said first pair of vertically hinged side panels or said second pair of vertically hinged side panels, to said hinged cover.

12. The caddy of claim 3 wherein said container second panel has an outer periphery less than said interior periphery of said caddy and said first panel has a periphery approximately equal to said outer periphery of said caddy and said multiple sides are notched, thereby enabling a portion of said container to recess into said caddy.

13. The caddy of claim 4 wherein said hinged bottom panel further contains at least one recess to retain said at least one hanger, said at least one recess being dimensioned to receive first portion and said second portion of each of said at least one hanger.

\* \* \* \* \*